United States Patent
Hongo et al.

(10) Patent No.: US 9,371,823 B2
(45) Date of Patent: Jun. 21, 2016

(54) POLYMERIC ACTUATOR, ACTUATOR DEVICE, METHOD OF MANUFACTURING POLYMERIC ACTUATOR, AND METHOD OF MANUFACTURING ACTUATOR DEVICE

(71) Applicant: Sony Corporation, Tokyo (JP)

(72) Inventors: Kazuhiro Hongo, Kanagawa (JP); Koji Fukumoto, Kanagawa (JP); Takashi Kinoshita, Kanagawa (JP)

(73) Assignee: Sony Corporation, Tokyo (JP)

( * ) Notice: Subject to any disclaimer, the term of this patent is extended or adjusted under 35 U.S.C. 154(b) by 610 days.

(21) Appl. No.: 13/900,310

(22) Filed: May 22, 2013

(65) Prior Publication Data

US 2013/0318961 A1   Dec. 5, 2013

(30) Foreign Application Priority Data

May 30, 2012   (JP) .................................. 2012-123062

(51) Int. Cl.
 *H01L 41/08*   (2006.01)
 *F03G 7/06*   (2006.01)

(52) U.S. Cl.
 CPC ........... *F03G 7/065* (2013.01); *Y10T 29/49002* (2015.01)

(58) Field of Classification Search
 USPC .......................... 310/311, 328, 363–366, 800
 See application file for complete search history.

(56) References Cited

U.S. PATENT DOCUMENTS

| | | | | |
|---|---|---|---|---|
| 4,469,978 A | * | 9/1984 | Hamada et al. ............... | 310/366 |
| 4,488,873 A | * | 12/1984 | Bloomfield et al. ........... | 433/71 |
| 4,725,994 A | * | 2/1988 | Kaneko et al. ................ | 367/140 |
| 6,543,110 B1 | * | 4/2003 | Pelrine et al. ............... | 29/25.35 |
| 8,203,254 B2 | * | 6/2012 | Takahashi ..................... | 310/328 |
| 8,253,308 B2 | * | 8/2012 | Ono et al. ..................... | 310/363 |
| 2014/0272537 A1 | * | 9/2014 | Kretschmar et al. .......... | 429/149 |

\* cited by examiner

*Primary Examiner* — Thomas Dougherty
(74) *Attorney, Agent, or Firm* — Chip Law Group

(57) ABSTRACT

There is provided a polymeric actuator including: a pair of facing portions located so as to face each other; and a folded portion through which one end portions of the pair of facing portions are coupled to each other, wherein the pair of facing portions and the folded portion are composed of an inner electrode layer, an electrolyte layer, and an outer electrode layer which are laminated in order from an inside. Therefore, the displacements are generated in the pair of facing portions, respectively, to be added to each other, and the displacement is generated in the folded portion as well due to the bending. As a result, the large displacement is generated as a whole. Thus, it is possible to increase the displacement amount after the simplification of the structure is realized.

15 Claims, 23 Drawing Sheets

POLYMERIC ACTUATOR, ACTUATOR DEVICE, METHOD OF MANUFACTURING POLYMERIC ACTUATOR, AND METHOD OF MANUFACTURING ACTUATOR DEVICE

BACKGROUND

The present disclosure relates to a polymeric actuator, an actuator device, a method of manufacturing the polymeric actuator, and a method of manufacturing the actuator device. More particularly, the present disclosure relates to a polymeric actuator in which a displacement amount is increased after a structure is simplified and in which a pair of facing portions disposed so as to face each other, and a folded portion through which one end portions of the pair of facing portions are coupled to each other are composed of an inner electrode layer, an electrolyte layer, and an outer electrode layer which are laminated in order one upon another, thereby simplifying a structure, an actuator device including the polymeric actuator, a method of manufacturing the polymeric actuator, and a method of manufacturing the actuator device.

A polymeric actuator is used in various kinds of fields of various kinds of electronic apparatuses such as a controller of an electronic device, a robot, medical equipment, a micromachine, and an image pickup apparatus.

Such a polymeric actuator, for example, is used as a driving portion for generating a driving force with which a lens is moved in an optical axis direction or in a direction perpendicular to an optical axis in the various kinds of image pickup apparatuses such as a video camera and a still camera. In this case, lenses (lens group) are moved in the optical axis direction by the polymeric actuator, thereby carrying out the focusing or zooming. Also, an image pickup element such as a lens, a Charge Coupled Device (CCD) or a Complementary Metal-Oxide Semiconductor (CMOS) is moved in a direction perpendicular to the optical axis, thereby carrying out hand movement correction.

The polymeric actuator as described above is an actuator which is displaced by a stimulation applied thereto from the outside, for example, a chemical stimulation, an electrical stimulation, a thermal stimulation, a light stimulation, a magnetic stimulation or the like. In particular, in recent years, a research which is of a type in which a displacement is generated by the electrical stimulation to generate the driving force has been actively carried out.

Such a polymeric actuator has a merit that the polymeric actuator has a high energy efficiency, and can be manufactured at a low cost. In general, however, since an amount of displacement is small, an actuator device in which plural polymeric actuators are coupled to one another in order to increase an amount of displacement is used in many cases.

For the purpose of using the polymeric actuator and actuator device described above in the various kinds of fields, preferably, after the miniaturization has been ensured, the increase in the amount of displacement is realized.

In order to cope with such a situation, as far as the existing polymeric actuator and actuator device concerned, there is known a technique with which the miniaturization and the increase in the amount of displacement are realized. This technique, for example, is disclosed in Japanese Patent Laid-Open No. 2007-28749 (hereinafter referred to as Patent Document 1).

The polymeric actuator disclosed in Patent Document 1 is formed in a plate-like shape extending in one direction, and is structured in such a way that electrode layers are provided on sides facing each other through an electrolyte layer, and the electrode layers intersect with each other in an intermediate portion of the electrolyte layer.

Also, the actuator device disclosed in Patent Document 1 is also structured in such a way that in the polymeric actuators, the electrode layers are connected to one another in end portions thereof in a longitudinal direction, and the end portions are coupled to each other in the longitudinal direction of the adjacent polymeric actuators by a fastener, thereby coupling plural polymeric actuators to one another.

SUMMARY

However, in the existing polymeric actuator and actuator device concerned disclosed in Patent Document 1, the mutual electrode layers are structured so as to intersect with each other in the intermediate portion of the electrolyte layer. For this reason, the structure is complicated, the manufacture is not easy, and thus the manufacturing cost is increased.

In addition, since the adjacent polymeric actuators are coupled to each other by the fastener, it is feared that the fastener drops off from the polymeric actuators depending on the coupling state provided by the fastener, and an amount of displacement generated in each of the polymeric actuators. On the other hand, when the adjacent polymeric actuators are strongly coupled to each other by the fastener, it is feared that a strain is generated in each of the polymeric actuators, and thus it may be impossible to ensure an amount of necessary displacement in the necessary direction.

The present disclosure has been made in order to solve the problems described above, and it is therefore desirable to provide a polymeric actuator in which an amount of displacement is increased after a structure is simplified, an actuator device including the polymeric actuator, a method of manufacturing the polymeric actuator, and a method of manufacturing the actuator device.

In order to attain the desire described above, firstly, according to an embodiment of the present disclosure, there is provided a polymeric actuator including: a pair of facing portions located so as to face each other; and a folded portion through which one end portions of the pair of facing portions are coupled to each other, in which the pair of facing portions and the folded portion are composed of an inner electrode layer, an electrolyte layer, and an outer electrode layer which are laminated in order from an inside.

Therefore, in the polymeric actuator according to the embodiment of the present disclosure, the pair of facing portion is coupled by the folded portion, and the inner electrode layer and the outer electrode layer are located across the electrolyte layer from each other.

Secondary, preferably, in the polymeric actuator according to the embodiment of the present disclosure, at least a part thereof may be bent within a surface perpendicular to a facing direction of the pair of facing portions.

At least the part of the polymeric actuator is bent within the surface perpendicular to the facing direction of the pair of facing portions. As a result, the displacements in the directions other than the facing direction are mutually regulated among the individual portions, any of the displacements is hard to cause in the directions other than the facing direction, and thus a loss of the displacement generated in the displacement direction is small.

Thirdly, in the polymeric actuator, according to the embodiment of the present disclosure, preferably, the polymeric actuator may be formed in an annular or ring-like regular polygon-shape with a virtual axis extending in the facing direction as a center.

The polymeric actuator is formed in the annular or circular regular polygon shape with the virtual axis extending in the facing direction as the center, whereby the displacements within the surface perpendicular to the facing direction are canceled each other with high precision.

Fourthly, in the polymeric actuator according to the embodiment of the present disclosure, preferably, the polymeric actuator may further include: a first lamination body composed of one of the pair of facing portions, and one half portion of the folded portion; and a second lamination body composed of the other of the pair of facing portions, and the other half of the folded portion, in which the one half of the folded portion of the first lamination body, and the other half of the folded portion of the second lamination body may be formed by joining in a state in which a partition member is disposed between the one of the pair of facing portions, and the other of the pair of facing portions.

The one half of the folded portion of the first lamination body, and the other half of the folded portion of the second lamination body are formed by the joining in the state in which the partition member is disposed between the one of the pair of facing portions, and the other of the pair of facing portions, whereby the formation of the polymeric actuator becomes easy.

Fifthly, according to another embodiment of the present disclosure, there is provided an actuator device including: plural polymeric actuators in each of which a pair of facing portions located so as to face each other, and a folded portion through which one end portions of the pair of facing portions are coupled to each other are composed of an inner electrode layer, an electrolyte layer, and an outer electrode layer which are laminated in order from an inside, in which the plural polymeric actuators are coupled to one another by a coupling body in a state in which the plural polymeric actuators are disposed side by side in a facing direction of the pair of facing portions.

Therefore, in the actuator device according to another embodiment described above of the present disclosure, in each of the plural polymeric actuators, the pair of facing portions is coupled by the folded portion. Also, the inner electrode layer and the outer electrode layer are located across the electrolyte layer from each other.

Sixthly, in the actuator device according to another embodiment described above of the present disclosure, preferably, end portions located on a side opposite to a side of the folded portion in the adjacent facing portions in the plural polymeric actuators may be coupled to each other by the coupling body.

The end portions located on the side opposite to the side of the folded portion in the adjacent facing portions in the plural polymeric actuators are coupled to each other by the coupling body, whereby a loss of the displacement is small in an operation direction.

Seventhly, in the actuator device according to another embodiment described above of the present disclosure, preferably, a thickness of the coupling body may be made thinner than that of the folded portion.

The thickness of the coupling body is made thinner than that of the folded portion, whereby a load in a phase of the displacement of the actuator device is reduced.

Eighthly, in the actuator device according to another embodiment described above of the present disclosure, preferably, hardness of the coupling body may be made smaller than that of each of the polymeric actuators.

The hardness of the coupling body is made smaller than that of each of the polymeric actuators, whereby the load in the phase of the displacement of the actuator device is further reduced.

Ninthly, in the actuator device according to another embodiment described above of the present disclosure, preferably, the coupling body may be made of the same material as that of either the inner electrode layer or the outer electrode layer; and the inner electrode layers or the outer electrode layers of the plural polymeric actuators are coupled to one another by the coupling body.

The coupling body is made of the same material as that of either the inner electrode layer or the outer electrode layer, and the inner electrode layers or the outer electrode layers of the plural polymeric actuators are coupled to one another by the coupling body, whereby the joining property between the coupling body and the electrode layers is enhanced.

Tenthly, in the actuator device according to another embodiment described above of the present disclosure, preferably, the coupling body may be made of a conductive material; and the inner electrode layers or the outer electrode layers of the plural polymeric actuators may be coupled to one another by the coupling body.

The coupling body is made of the conductive material, and the inner electrode layers or the outer electrode layers of the plural polymeric actuators are coupled to one another by the coupling body, whereby the conduction property between the electrode layers is obtained by the coupling body.

Eleventhly, in the actuator device according to another embodiment described above of the present disclosure, preferably, the coupling body may be composed of a flexible printed wiring board.

The coupling body is composed of the flexible printed wiring board, whereby the excellent bending property and conduction property of the coupling body are ensured, and thus the load in the phase of the displacement of the actuator device is reduced.

Twelfthly, in the actuator device according to another embodiment described above of the present disclosure, preferably, the coupling body may be structured by joining one end portions of two sheets of connection sheets to each other; and the other end portion of one of the two sheets of connection sheets, and the other end portion of the other of the two sheets of connection sheets may be joined to the facing portions, respectively.

The coupling body is structured by joining the one end portions of the two sheets of connection sheets to each other, and the other end portion of one of the two sheets of connection sheets, and the other end portion of the other of the two sheets of connection sheets are joined to the facing portions, respectively, whereby the simplification of the structure, and the excellent bending property of the coupling body are both ensured.

Thirteenthly, in the actuator device according to another embodiment described above of the present disclosure, preferably, the coupling body may be joined to each of the facing portions in a state in which a partition member may be disposed between the facing portion of one of the plural polymeric actuators, and the facing portion of the other of the plural polymeric actuators.

The coupling body is joined to each of the facing portions in the state in which the partition member is disposed between the facing portion of one of the plural polymeric actuators, and the facing portion of the other of the plural polymeric actuators, whereby the actuator device becomes easy to manufacture.

Fourteenthly, according to still another embodiment of the present disclosure, there is provided a method of manufacturing a polymeric actuator including: forming a first lamination body composed of an inner electrode layer, an electrolyte layer, and an outer electrode layer which are laminated in order; forming a second lamination body composed of an inner electrode layer, an electrolyte layer, and an outer electrode layer which are laminated in order; locating the first lamination body and the second lamination body so as to face each other in a state in which a partition member is disposed in a portion except for a part between the first lamination body and the second lamination body; joining portions, in none of which the partition member is disposed, of the first lamination body and the second lamination body to one another, so that each of the portions thus joined is formed as a folded portion; and removing away the partition member from the part between the first lamination body and the second lamination body.

Therefore, in the method of manufacturing a polymeric actuator according to still another embodiment described above of the present disclosure, the pair of facing portions is coupled by the folded portion, and the inner electrode layer and the outer electrode layer are located across the electrolyte layer from each other.

Fifteenthly, according to yet another embodiment of the present disclosure, there is provided a method of manufacturing an actuator device including: providing plural polymeric actuators in each of which a pair of facing portions located so as to face each other, and a folded portion through which one end portions of the pair of facing portions are coupled to each other are composed of an inner electrode layer, an electrolyte layer, and an outer electrode layer which are laminated in order from an inside; and joining the coupling body to each of the facing portions in a state in which a partition member is disposed between the facing portion of one of the plural polymeric actuators, and the facing portion of the other of the plural polymeric actuators.

Therefore, in the method of manufacturing an actuator device according to yet another embodiment described above of the present disclosure, in each of the plural polymeric actuators, the pair of facing portions is coupled by the folded portion, and the inner electrode layer and the outer electrode layer are located across the electrolyte layer from each other.

Firstly, the polymeric actuator according to the embodiment described above of the present disclosure includes the pair of facing portions located so as to face each other, and the folded portion through which one end portions of the pair of facing portions are coupled to each other, in which the pair of facing portions and the folded portions are composed of the inner electrode layer, the electrolyte layer, and the outer electrode layer which are laminated in order from the inside.

Therefore, the displacements are generated in the pair of facing portions, respectively, to be added to each other, and the displacement is generated in the folded portion as well due to the bending. Thus, it is possible to increase the displacement amount after the simplification of the structure is realized.

Secondly, the at least a part thereof is bent within the surface perpendicular to the facing direction of the pair of facing portions.

Therefore, the displacements in the directions other than the facing direction are mutually regulated between the individual portions. Thus, any of the displacements is hard to generate in the directions other than the facing direction, and thus the loss of the displacement generated in the displacement direction is small. As a result, it is possible to realize the stable operation in the displacement direction.

Thirdly, the polymeric actuator is formed in the annular or ring-like regular polygon-shape with the virtual axis extending in the facing direction as the center.

Therefore, the displacements within the surface perpendicular to the facing direction are canceled each other with the high precision, and thus it is possible to realize the more stable operation in the displacement direction with the simple structure.

Fourthly, the polymeric actuator further includes: the first lamination body composed of one of the pair of facing portions, and one half portion of the folded portion, and the second lamination body composed of the other of the pair of facing portions, and the other half of the folded portion, in which the one half of the folded portion of the first lamination body, and the other half of the folded portion of the second lamination body are formed by joining in the state in which the partition member is disposed between the one of the pair of facing portions, and the other of the pair of facing portions.

Therefore, the formation of the polymeric actuator is easy, and thus it is possible to reduce the manufacturing cost.

Fifthly, the actuator device according to another embodiment described above of the present disclosure includes the plural polymeric actuators in each of which the pair of facing portions located so as to face each other, and the folded portion through which the one end portions of the pair of facing portions are coupled to each other are composed of the inner electrode layer, the electrolyte layer, and the outer electrode layer which are laminated in order from the inside, in which the plural polymeric actuators are coupled to one another by the coupling body in the state in which the plural polymeric actuators are disposed side by side in the facing direction of the pair of facing portions.

Therefore, in the plural polymeric actuators, the displacements are generated in the pair of facing portions to be added to each other, and the displacement due to the bending is generated in the folded portion as well. As a result, after the simplification of the structure is realized, it is possible to increase the displacement amount.

Sixthly, the end portions located on the side opposite to the side of the folded portion in the adjacent facing portions in the plural polymeric actuators are coupled to each other by the coupling body.

Therefore, the loss of the displacement is small in the operation direction, and thus it is possible to ensure the large displacement amount.

Seventhly, the thickness of the coupling body is made thinner than that of the folded portion.

Therefore, the load in the phase of the displacement of the polymeric actuator is reduced, and thus it is possible to ensure the large displacement amount.

Eighthly, the hardness of the coupling body is made smaller than that of each of the polymeric actuators.

Therefore, the load in the phase of the displacement of the polymeric actuator is further reduced, and thus it is possible to ensure the larger displacement amount.

Ninthly, the coupling body is made of the same material as that of either the inner electrode layer or the outer electrode layer, and the inner electrode layers or the outer electrode layers of the plural polymeric actuators are coupled to one another by the coupling body.

Therefore, it is possible to ensure the excellent joining property between the coupling body and the inner electrode layer or the outer electrode layer.

Tenthly, the coupling body is made of the conductive material, and the inner electrode layers or the outer electrode layers of the plural polymeric actuators are coupled to one another by the coupling body.

Therefore, the conduction property between the outer electrode layers, and the conduction property between the inner electrode layers are realized by the coupling body, and thus it is unnecessary to provide any of other conduction units. As a result, it is possible to realize the reduction in the number of parts or components, and the simplification of the structure in the actuator device.

Eleventhly, the coupling body is composed of the flexible printed wiring board.

Therefore, it is possible to ensure the excellent bending property and conduction property of the coupling body. Also, the load in the phase of the displacement of the actuator device is reduced, and thus it is possible to ensure the large displacement amount. As a result, it is possible to realize the reduction in the number of parts or components, and the simplification of the structure in the actuator device.

Twelfthly, the coupling body is structured by joining the one end portions of the two sheets of connection sheets to each other, and the other end portion of one of the two sheets of connection sheets, and the other end portion of the other of the two sheets of connection sheets are joined to the facing portions, respectively.

Therefore, it is possible to ensure the simplification of the structure, and the excellent bending property in the coupling body. Also, the load applied from the coupling body in the phase of the displacement of the actuator device is reduced. As a result, it is possible to ensure the large displacement amount of the actuator device.

Thirteenthly, the coupling body is joined to each of the facing portions in the state in which the partition member is disposed between the facing portion of one of the plural polymeric actuators, and the facing portion of the other of the plural polymeric actuators.

Therefore, the manufacture of the actuator device is easy, and thus it is possible to reduce the manufacturing cost.

Fourteenthly, the method of manufacturing a polymeric actuator includes: forming the first lamination body composed of the inner electrode layer, the electrolyte layer, and the outer electrode layer which are laminated in order; forming the second lamination body composed of the inner electrode layer, the electrolyte layer, and the outer electrode layer which are laminated in order; locating the first lamination body and the second lamination body so as to face each other in the state in which the partition member is disposed in the portion except for the part between the first lamination body and the second lamination body; joining the portions, in none of which the partition member is disposed, of the first lamination body and the second lamination body to one another so that each of the portions thus joined is formed as the folded portion; and removing away the partition member from the part between the first lamination body and the second lamination body.

Therefore, the displacements are generated in the pair of facing portions to be added to each other, and the displacement due to the bending is generated in the folded portion as well. As a result, after the simplification of the structure is realized, it is possible to increase the displacement amount.

Fifteenthly, the method of manufacturing an actuator device includes: providing the plural polymeric actuators in each of which the pair of facing portions located so as to face each other, and the folded portion through which one end portions of the pair of facing portions are coupled to each other are composed of the inner electrode layer, the electrolyte layer, and the outer electrode layer which are laminated in order from an inside; and joining the coupling body to each of the facing portions in the state in which the partition member is disposed between the facing portion of one of the plural polymeric actuators, and the facing portion of the other of the plural polymeric actuators.

Therefore, in the plural polymeric actuators, the displacements are generated in the pair of facing portions to be added to each other, and the displacement due to the bending is generated in the folded portion as well. As a result, after the simplification of the structure is realized, it is possible to increase the displacement amount.

DETAILED DESCRIPTION OF THE PREFERRED EMBODIMENTS

Hereinafter, a polymeric actuator, an actuator device, a method of manufacturing the polymeric actuator, and a method of manufacturing the actuator device according to embodiments of the present disclosure will be described in detail with reference to the accompanying drawings.

In the following description, a thickness direction of the polymeric actuator is defined as a vertical direction, and under this condition, front-back, vertical, and horizontal directions are shown.

It is noted that the front-back, vertical, and horizontal directions which will be shown below are defined for the sake of convenience of the description, and when the present disclosure is embodied, the present disclosure is by no means limited these directions.

Structure and Operation of Polymeric Actuator

First Embodiment

Firstly, a structure and an operation of a polymeric actuator according to a first embodiment of the present disclosure will now be described with reference to FIGS. 1 and 2, respectively.

Figure 1:
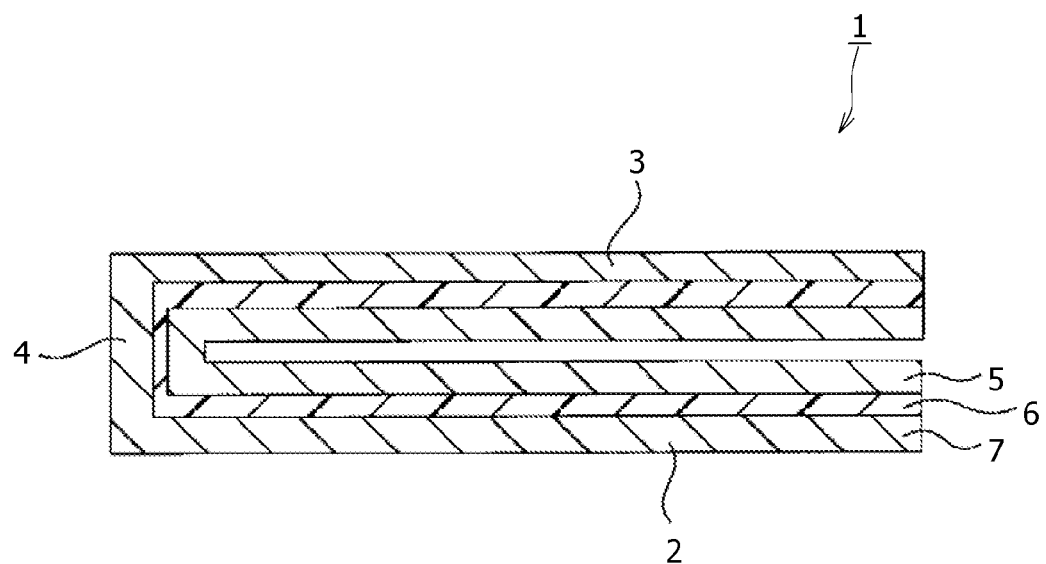
FIG. 1 is an enlarged cross sectional view of a polymeric actuator according to a first embodiment of the present disclosure.
Figure 2:
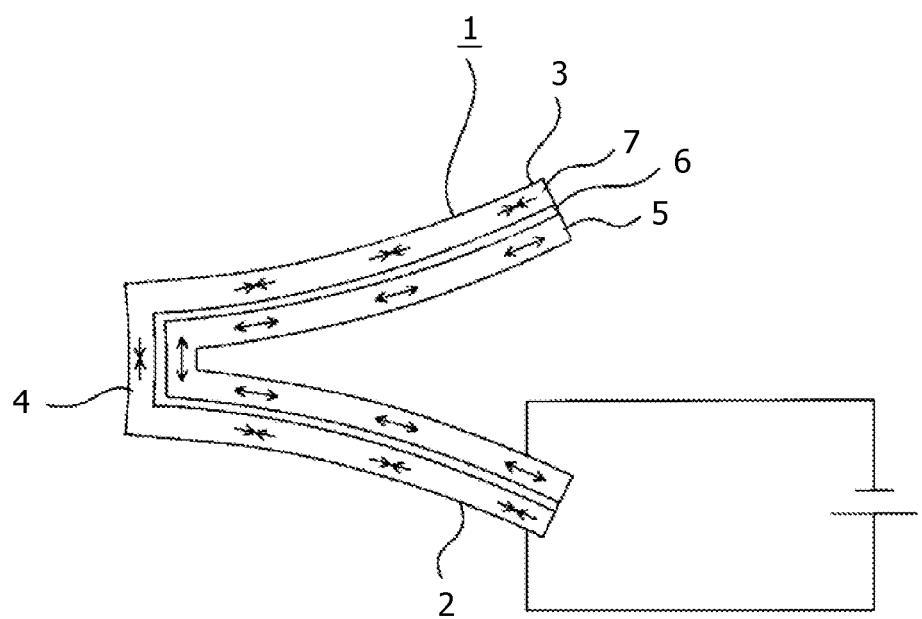
FIG. 2 is a conceptual view showing an operation state of the polymeric actuator according to the first embodiment of the present disclosure.

The polymeric actuator 1 according to the first embodiment of the present disclosure is composed of a first facing portion 2, a second facing portion 3, and a folded portion 4 as shown in FIG. 1.

The first facing portion 2 and the second facing portion 3 are located so as to face each other in the thickness direction (in the vertical direction). Also, the first facing portion 2 and the second facing portion 3 are formed so as to have the same size and a symmetrical shape. The thickness direction agrees with a facing direction in which the first facing portion 2 and the second facing portion 3 face each other. Also, the folded portion 4 is provided so as to couple one end portions of the first facing portion 2 and the second facing portion 3 to each other.

The polymeric actuator 1 is formed either approximately in a squared U letter-like shape or approximately in a U letter-like shape when viewed from a side by the first facing portion 2, the second facing portion 3, and the folded portion 4.

The polymeric actuator 1 is composed of an inner electrode layer 5, an electrolyte layer 6, and an outer electrode layer 7 which are laminated in order one upon another from an inside. The inner electrode layer 5 and the outer electrode layer 7, for example, are made of the same material.

In the polymeric actuator 1 structured in the manner as described above, when conduction is made between the inner electrode layer 5 and the outer electrode layer 7, and thus an electric potential difference is developed across the inner electrode layer 5 and the outer electrode layer 7, ions are moved between the inner electrode layer 5 and the outer electrode layer 7 through the electrolyte layer 6. When the movement of the ions is caused, as shown in FIG. 2, the inner electrode layer 5 expand and the outer electrode layer 7 contracts, so that a displacement is generated in a direction in which the first facing portion 2 and the second facing portion 3 are made away from each other. At this time, the expansion and the contraction are generated in the inner electrode layer 5 and the outer electrode layer 7, respectively, in each of the first facing portion 2 and the second facing portion 3. Also, in the folded portion 4 as well, the expansion and the contraction are generated in the inner electrode layer 5 and the outer electrode layer 7, respectively.

Therefore, the displacements are generated in the first facing portion 2 and the second facing portion 3 as the different portions, respectively, to be added to each other. Also, in the folded portion 4 as well, the displacement due to the bending is generated. As a result, the large displacement is generated as the whole of the polymeric actuator 1.

In such a manner, in the polymeric actuator 1, since the large displacement is generated as a whole, it is possible to obtain a large driving force. In addition, since in the polymeric actuator 1, the first facing portion 2 and the second facing portion 3 are located so as to face each other, the disposition space only has to be small, and thus after the miniaturization is ensured, it is possible to obtain a large driving force.

In addition thereto, since the polymeric actuator 1 is structured in such a way that the inner electrode layer 5 and the outer electrode layer 7 are laminated on top of each other through the electrolyte layer 6, the structure is simple, and thus after the structure is simplified, it is possible to increase the displacement amount.

Shapes of Polymeric Actuator

Second and Third Embodiments, and Modified Changes Thereof

Next, shapes of the polymeric actuator will now be described with reference to FIGS. 3 to 11.

First Shape

Second and Third Embodiments

A polymeric actuator 1A, 1B having the first shape is formed in an annular shape with a virtual axis P extending in a vertical direction (in a facing direction) as a center (refer to FIGS. 3 to 6).

Figure 3:
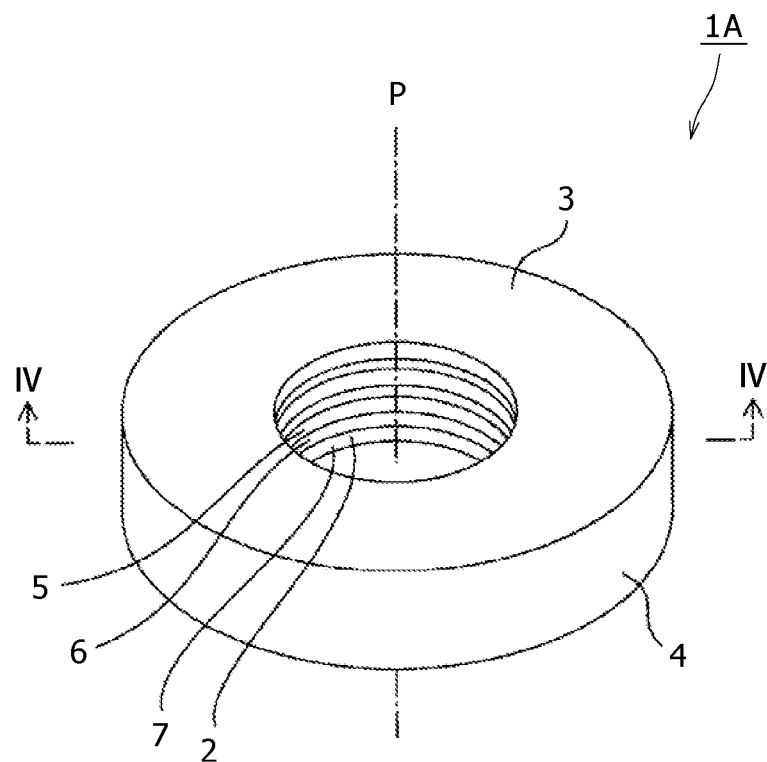
FIG. 3 is an enlarged perspective view showing a polymeric actuator, which is formed in an annular shape, according to a second embodiment of the present disclosure.
Figure 4:
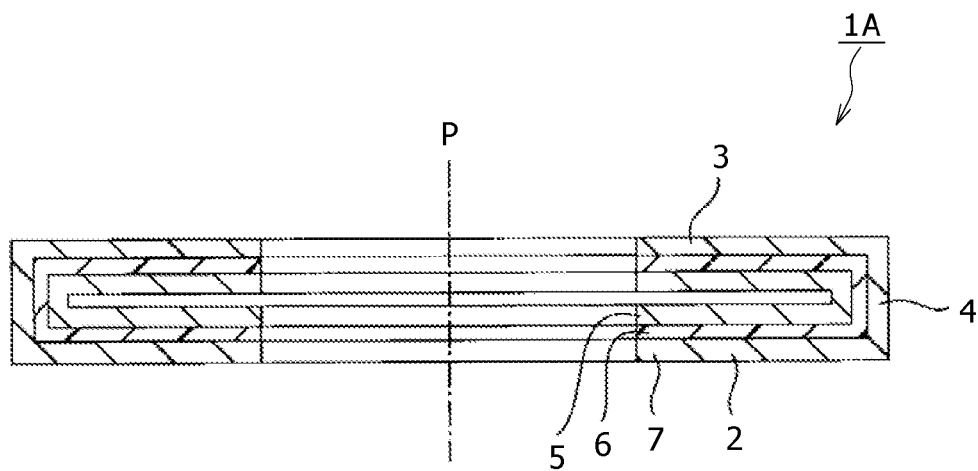
FIG. 4 is a cross sectional view taken on line IV-IV of FIG. 3.
Figure 5:
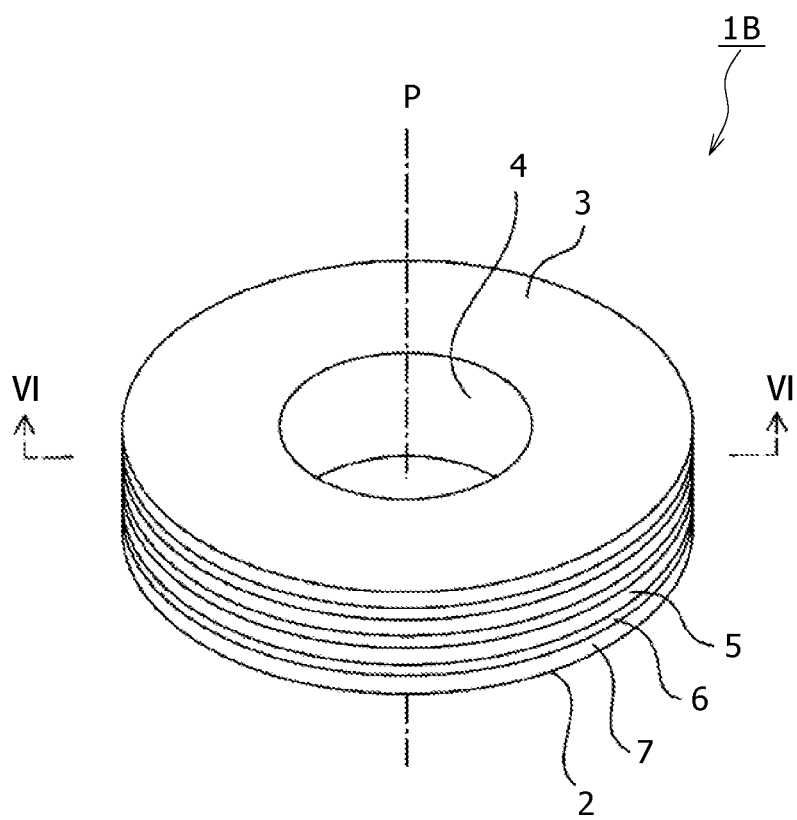
FIG. 5 is an enlarged perspective view showing a polymeric actuator, which is formed in an annular shape, according to a third embodiment of the present disclosure.
Figure 6:
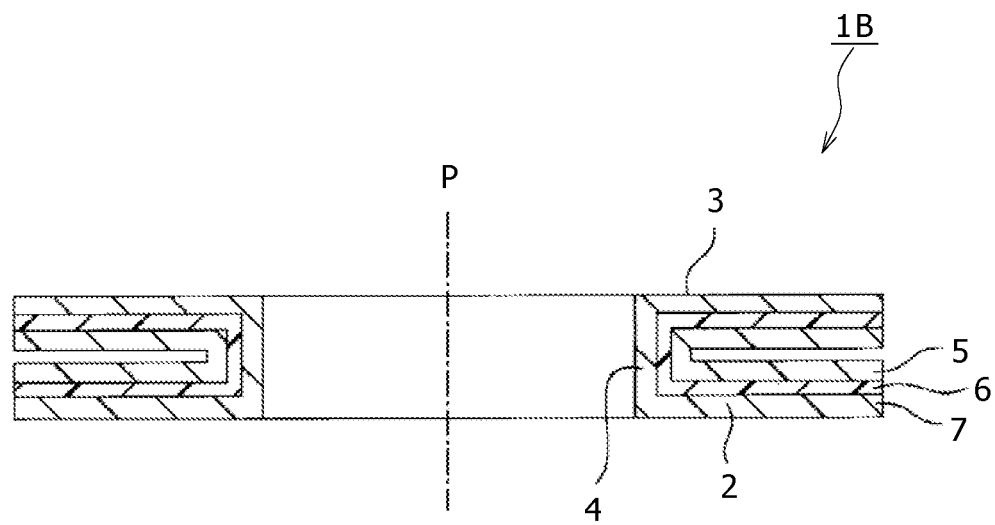
FIG. 6 is a cross sectional view taken on line VI-VI of FIG. 5.

In the polymeric actuator 1A according to a second embodiment of the present disclosure, an outer peripheral portion thereof is provided as the folded portion 4 as shown in FIGS. 3 and 4. Also, in the polymeric actuator 1B according to a third embodiment of the present disclosure, an inner peripheral portion thereof is provided as the folded portion 4 as shown in FIGS. 5 and 6.

The polymeric actuator 1A, 1B which is formed in the annular shape of the second or third embodiment is not formed in a straight line-like shape, but is formed in a bent shape (in a circular shape) within a surface perpendicular to a thickness direction as a displacement direction. Therefore, the displacements in the directions other than the thickness direction are mutually regulated between the individual portions. As a result, the displacement is hard to generate in any of the directions other than the thickness direction, and thus a loss of the displacement generated in the displacement direction is small.

Therefore, it is possible to realize the stable operation in the displacement direction.

In particular, the polymeric actuator 1A, 1B of the second or third embodiment has the superior axial symmetry because it is formed in the annular shape. Thus, the displacements within the surface perpendicular to the thickness direction are canceled each other with the high precision. As a result, it is possible to realize the more stable operation in the displacement direction with the simple structure.

Figure 7:
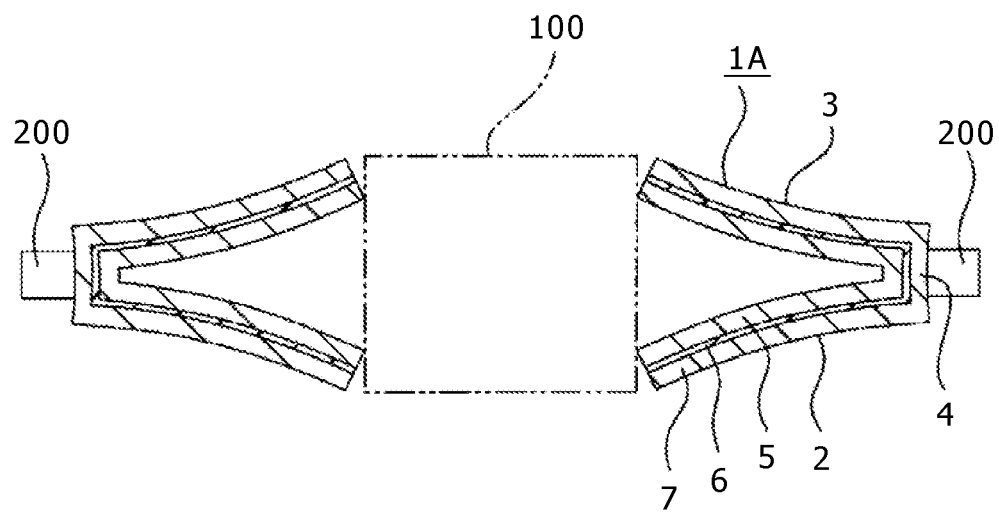
FIG. 7 is a conceptual view showing an operation state of the polymeric actuator, in which a folded portion is provided in an outer peripheral portion, of the second embodiment of the present disclosure.

In addition, in the polymeric actuator 1A, in which the outer peripheral portion is provided as the folded portion, according to the second embodiment of the present disclosure, as shown in FIGS. 3 and 4, the displacement is generated in the direction in which the inner peripheral portions are made vertically away from one another. In this case, as shown in FIG. 7, a driven body 100 which is driven by the polymeric actuator 1A is disposed on the inner periphery side. Also, either a holding portion 200 which holds the polymeric actuator 1A, or a conduction portion 200 which carries out the conduction for the polymeric actuator 1A is disposed on the outer periphery side.

Therefore, in the polymeric actuator 1A, in which the outer peripheral portion thereof is provided as the folded portion 4, according to the second embodiment of the present disclosure, as shown in FIGS. 3 and 4, since the holding portion 200 (or the conduction portion 200) does not interfere with the driven body 100, the design about the dispositions of the individual portions becomes easy to make.

Figure 8:
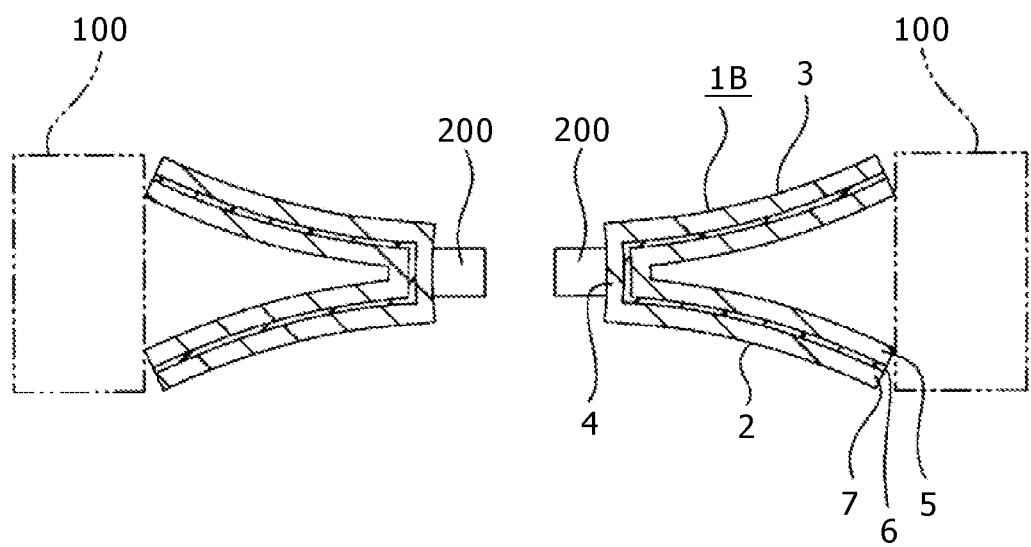
FIG. 8 is a conceptual view showing an operation state of the polymeric actuator, in which a folded portion is provided in an inner peripheral portion, of the third embodiment of the present disclosure.

On the other hand, in the polymeric actuator 1B, in which the inner peripheral portion thereof is provided as the folded portion 4, according to the third embodiment of the present disclosure, as shown in FIGS. 5 and 6, the displacement is generated in the direction in which the outer peripheral portions are made vertically away from one another. In this case, as shown in FIG. 8, the driven body 100 which is driven by the polymeric actuator 1B is disposed on the outer periphery side. Also, either the holding portion 200 which holds the polymeric actuator 1B, or the conduction portion 200 which carries out the conduction for the polymeric actuator 1B is disposed on the inner periphery side.

Therefore, in the polymeric actuator 1B, in which the inner peripheral portion thereof is provided as the folded portion 4, according to the third embodiment of the present disclosure, the connection to the driven body 100 is carried out on the periphery side. Therefore, an area of a connection portion of the driven body 100 to the polymeric actuator 1B becomes large. As a result, there is ensured the stable operation state for the driven body 100.

Second Shape

First Modified Change of Second or Third Embodiment

Figure 9:
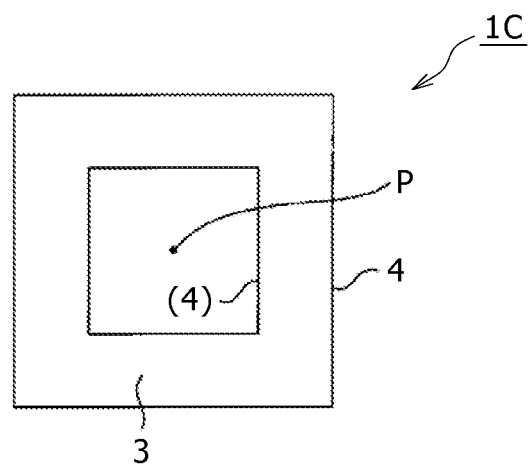
FIG. 9 is an enlarged top plan view showing a polymeric actuator, which is formed in a quadrangle-like shape, according to a first modified change of the second or third embodiment of the present disclosure.

A polymeric actuator 1C, having a second shape, according to a first modified change of the second or third embodiment of the present disclosure is formed in a ring-like regular polygon-shape, for example, a tetragon-shape with the virtual axis P as a center as shown in FIG. 9.

In the polymeric actuator 1C according to the first modified change of the second embodiment of the present disclosure, the outer peripheral portion thereof is provided as the folded portion 4. Or, in the polymeric actuator 1C according to the first modified change of the third embodiment of the present disclosure, the inner peripheral portion thereof is provided as the folded portion 4.

The polymeric actuator 1C, which is formed in the tetragon-shape, according to the first modified change of the second or third embodiment of the present disclosure is not formed in a straight line-like shape within the surface perpendicular to the thickness direction as the displacement direction, but a part thereof is formed in a bent shape. Therefore, the displacements in the directions other than the thickness direction are mutually regulated between the individual portions. As a result, the displacement is hard to generate in any of the directions other than the thickness direction, and thus a loss of the displacement generated in the displacement direction is small.

Therefore, it is possible to realize the stable operation in the displacement direction.

In particular, the polymeric actuator 1C of the first modified change of the second or third embodiment has the superior axial symmetry because it is formed in the tetragon-like shape. Thus, the displacements within the surface perpendicular to the thickness direction are canceled each other with the high precision. As a result, it is possible to realize the more stable operation in the displacement direction with the simple structure.

It is noted that although in the foregoing, the polymeric actuator 1A, 1B which is formed in the annular-like shape, and the polymeric actuator 1C which is formed in the tetragon-shape have been exemplified, the polymeric actuator 1, for example, may be formed in other circular shape such as an elliptical shape or an elongate hole-like shape.

Third Shape

Second Modified Change of Second or Third Embodiment

Figure 10:
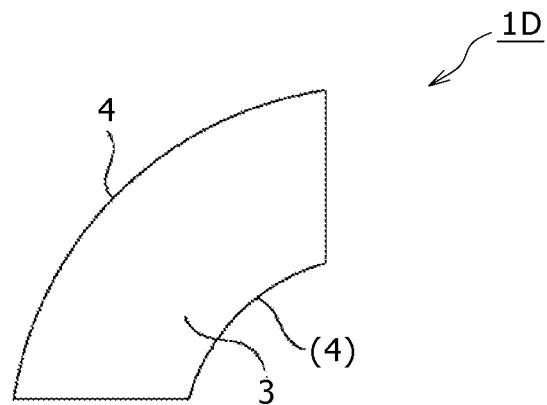
FIG. 10 is an enlarged top plan view showing a polymeric actuator, which is formed in a circular art-like shape, according to a second modified change of the second or third embodiment of the present disclosure.

A polymeric actuator 1D, having a third shape, according to a second modified change of the second or third embodiment of the present disclosure is formed in a circular arc-like shape as shown in FIG. 10.

In the polymeric actuator 1D according to the second modified change of the second embodiment of the present disclosure, the outer peripheral portion thereof is provided as the folded portion 4. Or, the polymeric actuator 1D according to the second modified change of the third embodiment of the present disclosure, the inner peripheral portion thereof is provided as the folded portion 4.

The polymeric actuator 1D, which is formed in the circular arc-like shape, according to the second modified change of the second or third embodiment of the present disclosure is not formed in a straight line-like shape, but is formed in the bent shape within the surface perpendicular to the thickness direction as the displacement direction. Therefore, the displacements in the directions other than the thickness direction are mutually regulated between the individual portions. As a result, the displacement is hard to generate in any of the directions other than the thickness direction, and thus a loss of the displacement generated in the displacement direction is small.

Therefore, it is possible to realize the stable operation in the displacement direction.

Fourth Shape

Third Modified Change of Second or Third Embodiment

Figure 11:
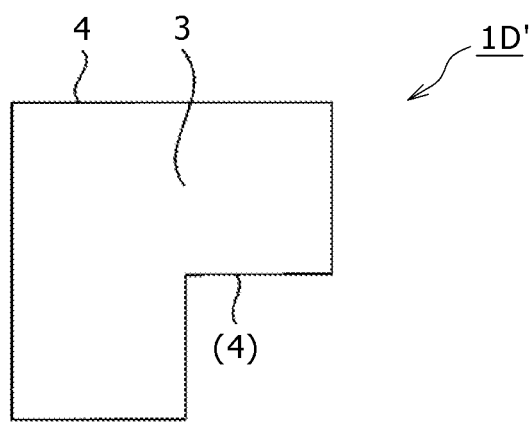
FIG. 11 is an enlarged top plan view showing a polymeric actuator, which is formed in an L letter-like shape, according to a third modified change of the second or third embodiment of the present disclosure.

A polymeric actuator 1D', having a fourth shape, according to a third modified change of the second or third embodiment of the present disclosure is formed in an L letter-like shape as shown in FIG. 11.

In the polymeric actuator 1D' according to the third modified change of the second embodiment of the present disclosure, the outer peripheral portion thereof is provided as the folded portion 4. Or, in the polymeric actuator 1D' according to the third modified change of the third embodiment of the present disclosure, the inner peripheral portion thereof is provided as the folded portion 4.

The polymeric actuator 1D', which is formed in the L letter-like shape, according to the third modified change of the second or third embodiment of the present disclosure is not formed in a straight line-like shape, but a part thereof is formed in a bent shape within the surface perpendicular to the thickness direction as the displacement direction. Therefore, the displacements in the directions other than the thickness direction are mutually regulated between the individual portions. As a result, the displacement is hard to generate in any of the directions other than the thickness direction, and thus a loss of the displacement generated in the displacement direction is small.

Therefore, it is possible to realize the stable operation in the displacement direction.

Note that, in the foregoing, the polymeric actuator 1D which is formed in the circular arc-like shape, and the polymeric actuator 1D' which is formed in the L letter-like shape have been exemplified. However, all it takes is that at least a part of the polymeric actuator 1A, 1B is formed in the bent shape within the surface perpendicular to the thickness direction as the displacement direction, and thus the polymeric actuator 1A, 1B may also be formed in any other suitable shape.

Method of Manufacturing Polymeric Actuator

Hereinafter, a method of manufacturing the polymeric actuator 1 according to the first embodiment of the present disclosure will be described in detail with reference to FIGS. 12A to 12G.

Figure 12A:
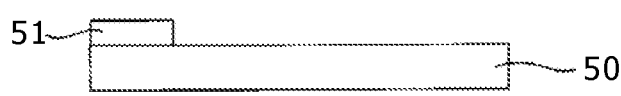
FIGS. 12A to 12G are respectively cross sectional views showing manufacturing processes in a method of manufacturing the polymeric actuator according to the first embodiment of the present disclosure.

Firstly, as shown in FIG. 12A, a first adjustable member 51 for formation of the electrode layer is installed on one end portion of a base 50.

Figure 12B:
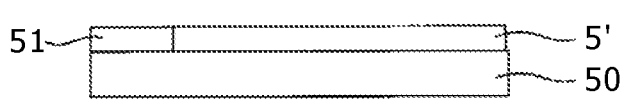

Next, as shown in FIG. 12B, an inner electrode layer 5' is formed on the base 50. The inner electrode layer 5' is a half portion of the inner electrode layer 5 in the polymeric actuator 1 according to the first embodiment of the present disclosure.

Figure 12C:
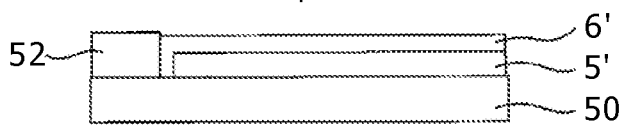

Next, as shown in FIG. 12C, the first adjustable member 51 is removed away from the base 50, a second adjustable member 52 for formation of the electrolyte layer is installed in a position which is shifted with respect to the position where the first adjustable member 51 was installed on the base 50, and an electrolyte layer 6' is then formed on the inner electrode layer 5'.

Figure 12D:
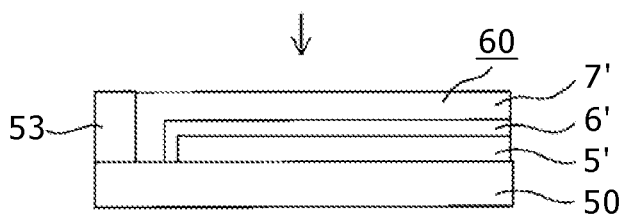

Next, as shown in FIG. 12D, the second adjustable member 52 is removed away from the base 50, a third adjustable member 53 for formation of the electrode layer is installed in a position which is shifted with respect to the position where the second adjustable member 52 was installed on the base 50, and an outer electrode layer 7' is then formed on the electrolyte layer 6'. The outer electrode layer 7' is a half portion of the outer electrode layer 7 in the polymeric actuator 1 of the first embodiment. The outer electrode layer 7' is formed in such a manner, whereby a first lamination body 60 as a half portion of the polymeric actuator 1 is formed.

Next, similarly to the above case, the inner electrode layer 5', the electrolyte layer 6', and the outer electrode layer 7' are formed, thereby forming a second lamination body 70 as a remaining half portion of the polymeric actuator 1.

Figure 12E:
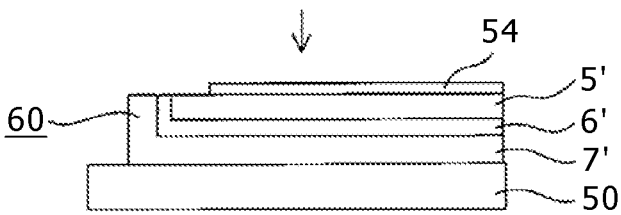
Figure 12F:
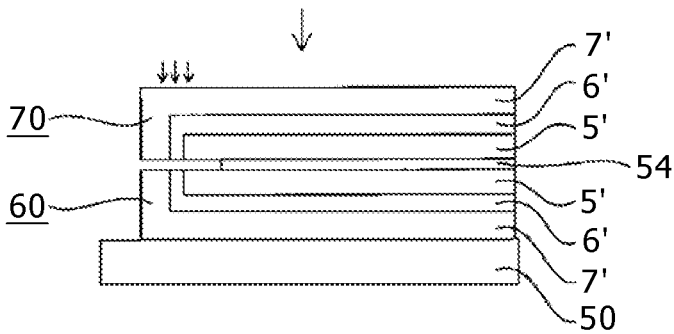

Next, as shown in FIG. 12E, a sheet member 54 is installed in a position between the inner electrode layers 5', 5' of the first lamination body 60 and the second lamination body 70. In this case, in this position, end portions of the sides of the electrolyte layers 6', 6' of the first lamination body 60 and the second lamination body 70 are both removed away. Next, as shown in FIG. 12F, the first lamination body 60 and the second lamination body 70 are laminated on top of each other through the sheet member 54. The sheet member 54, for example, is made of a material, having small adhesion, such as a fluorine resin.

Subsequently, portions in none of which the sheet member 54 is installed, for example, are joined to each other in a pressure bonding style by the thermal compression bond.

Figure 12G:
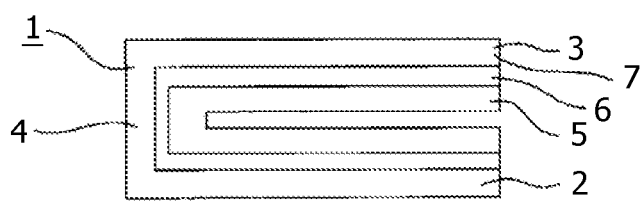

Finally, as shown in FIG. 12G, the sheet member 54 is drawn out to be taken out from the base 50, thereby forming the polymeric actuator 1.

In the manner as described above, the parts of the first lamination body 60 and the second lamination body 70 which are formed in the same size and in the symmetrical shape are joined to each other by the thermal compression bond, thereby forming the polymeric actuator 1. Therefore, the formation of the polymeric actuator 1 is easy, and thus it is possible to reduce the manufacturing cost.

In addition, the polymeric actuator 1 is formed in the non-vacuum processes such as the application of the materials formed to compose the inner electrode layers 5, the electrolyte layers 6, and the outer electrode layers 7, and the thermal compression bond. Therefore, it is possible to reduce the manufacturing cost.

It is noted that any of the polymeric actuator 1A of the second embodiment, the polymeric actuator 1B of the third embodiment, and the polymeric actuators 1C, 1D, and 1D' according to the first to third modified changes of the second or third embodiment of the present disclosure, of course, can be manufactured substantially by utilizing the same manufacturing method as that shown in FIGS. 12A to 12G.

Structures and Operations of Actuator Devices

Fourth Embodiment and Fifth Embodiment

Next, structures and operations of actuator devices according to fourth and fifth embodiments of the present disclosure will now be described in detail with reference to FIGS. 13 and 14.

Figure 13:
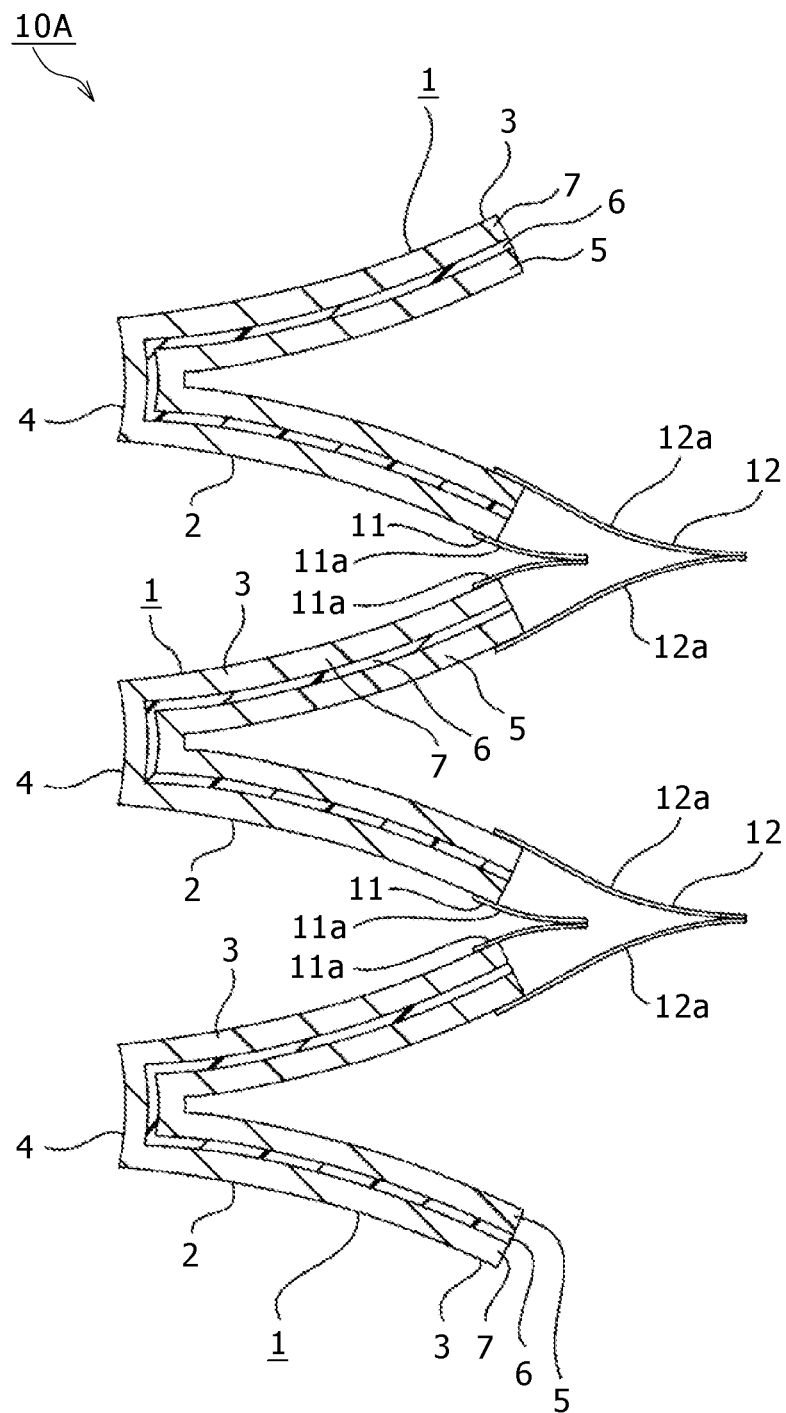
FIG. 13 is an enlarged cross sectional view showing an actuator device according to a fourth embodiment of the present disclosure.

As shown in FIG. 13, an actuator device 10A according to the fourth embodiment of the present disclosure is structured in such a way that plural polymeric actuators 1, 1, . . . are coupled to one another in a state in which the plural polymeric actuators 1, 1, . . . are arranged in the vertical direction (in the facing direction) by first coupling bodies 11, 11, . . . and second coupling bodies 12, 12, . . . each of which has elasticity. It is noted that FIG. 13 shows the case where three polymeric actuators 1, 1, 1 are coupled to one another (this also applies to an actuator device 10B according to the fifth embodiment of the present disclosure shown in FIG. 14).

One ends of two sheets of connection sheets 11a, 11a are joined to each other, thereby forming the first coupling body 11. In the first coupling body 11, the other ends of two sheets of connection sheets 11a, 11a are joined to head portions of the outer electrode layers 7, 7 in the adjacent polymeric actuators 1, 1, . . ., respectively.

One end portions of two sheets of connection sheets 12a, 12a are joined to each other, thereby forming the second coupling body 12. In this case, the connection sheet 12a is made longer than the connection sheet 11a. In the second coupling body 12, the other end portions of the connection sheets 12a, 12a are joined to head portions of the inner electrode layers 5, 5 in the adjacent polymeric actuators 1, 1, . . ., respectively.

In the actuator device 10A structured in the manner as described above, when the conduction is made between the inner electrode layers 5, 5, 5 and the outer electrode layers 7, 7, 7, and thus an electric potential difference is developed across each of the inner electrode layers 5, 5, 5 and each of the outer electrode layers 7, 7, 7, the extension is generated in each of the inner electrode layers 5, 5, 5, and the contraction is generated in each of the outer electrode layers 7, 7, 7. As a result, the displacement in the direction in which each of the first facing portions 2, 2, 2 and each of the second facing portions 3, 3, 3 are made away from each other is generated in each of the polymeric actuators 1, 1, 1. At this time, in each of the folded portions 4, 4, 4 as well, the extraction and the contraction are generated in each of the inner electrode layers 5, 5, 5 and each of the outer electrode layers 7, 7, 7, respectively.

The displacements are generated in the polymeric actuators 1, 1, 1, respectively, whereby the displacements are added, and thus the resulting large displacement is generated in the actuator device 10A.

When the displacement is generated in the actuator device 10A in the manner as described above, the first coupling bodies 11, 11, 11, and the second coupling bodies 12, 12, 12 are all bent to be elastically deformed so as to follow the displacements of the polymeric actuators 1, 1, 1, respectively. Therefore, there is absorbed an angle difference, in the head portions of the first facing portions 2, 2, 2 and the second facing portions 3, 3, 3, which is generated along with the displacements. In addition, the polymeric actuators 1, 1, 1 are coupled to one another by the first coupling bodies 11, 11, 11, and the second coupling bodies 12, 12, 12, whereby the displacements in the directions other than the vertical direction of the polymeric actuators 1, 1, 1 are regulated by the first coupling bodies 11, 11, 11, and the second coupling bodies 12, 12, 12. As a result, it is possible to ensure the stable operation state in the vertical direction of each of the polymeric actuators 1, 1, 1.

In addition, in the actuator device 10A, the end portions, which are located on a side opposite to the folded portions 4, 4, 4, of the adjacent first facing portions 2, 2, and second facing portions 3, 3 in the polymeric actuators 1, 1, 1 are coupled to each other by the first coupling bodies 11, 11, 11, and the second coupling bodies 12, 12, 12.

Therefore, the loss of the displacement is small in the operation direction of the actuator device 10A, and thus it is possible to ensure the large displacement amount.

As described above, since the large displacement is generated as a whole in the actuator device 10A, the driving force of the actuator device 10A becomes large. In addition, the actuator device 10A is structured by coupling the small polymeric actuators 1, 1, 1 each having the simple structure to one another. Therefore, after the simplification of the structure is realized, it is possible to increase the displacement amount.

In addition, in the first coupling body 11 and the second coupling body 12, one end portions of two sheets of connection sheets 11a, 11a are joined to each other, and one end portions of two sheets of connection sheets 12a, 12a are joined to each other. The other end portions of the two sheets of connection sheets 11a, 11a are joined to the first facing portion 2 and the second facing portion 3, respectively. Also, the other end portions of the two sheets of connection sheets 12a, 12a are joined to the first facing portion 2 and the second facing portion 3, respectively.

Therefore, the simplification and the excellent bending property of each of the first coupling body 11 and the second coupling body 12 are both ensured. Also, there is reduced the load applied from the first coupling body 11 and the second coupling body 12 in the phase of the displacement of the actuator device 10A. As a result, it is possible to ensure the large displacement amount of the actuator device 10A.

Preferably, each of the thicknesses of the first coupling body 11 and the second coupling body 12 is made thinner than that of the folded portion 4. Each of the thicknesses of the first coupling body 11 and the second coupling body 12 is made thinner than that of the folded portion 4, whereby the load in the phase of the displacement of each of the polymeric actuators 1 is reduced and thus it is possible to ensure the large displacement amount in each of the polymeric actuators 1.

In addition, preferably, the hardness of each of the first coupling body 11 and the second coupling body 12 is made smaller than that of the polymeric actuator 1. The hardness of each of the first coupling body 11 and the second coupling body 12 is made smaller than that of the polymeric actuator 1, whereby the load in the phase of the displacement of each of the polymeric actuators 1 is further reduced and thus it is possible to ensure the larger displacement amount in each of the polymeric actuators 1 of the actuator device 10A.

In addition thereto, preferably, for the purpose of making the electrical conduction with the polymeric actuator 1, each of the first coupling body 11 and the second coupling body 12 is made of a conductive material. Each of the first coupling body 11 and the second coupling body 12 is made of the conductive material, whereby the conduction between the outer electrode layers 7, 7, and the conduction between the inner electrode layers 5, 5 are made by the first coupling body 11 and the second coupling body 12, respectively, and thus it is unnecessary to provide other conduction units. As a result, it is possible to realize the reduction in the number of parts or components, and the simplification of the structure in the actuator device 10A.

In particular, each of the first coupling body 11 and the second coupling body 12 is composed of a flexible printed wiring board, whereby it is possible to ensure both of the excellent bending property and conduction property of each of the first coupling body 11 and the second coupling body 12. As a result, there is reduced the load in the phase of the displacement of each of the polymeric actuators 1, and thus it is possible to ensure the large displacement amount in the polymeric actuators 1. Also, it is possible to realize the reduction in the number of parts or components, and the simplification of the structure in the actuator device 10A.

It is noted that the first coupling body 11 may be made of the same material as that of the outer electrode layer 7, and the second coupling body 12 may be made of the same material as that of the inner electrode layer 5.

The first coupling body 11 is made of the same material as that of the outer electrode layer 7, or the second coupling body 12 is made of the same material as that of the inner electrode layer 5, whereby it is possible to ensure the excellent joining property between the first coupling body 11 and the outer electrode layer 7, and the excellent joining property between the second coupling body 12 and the inner electrode layer 5.

Figure 14:
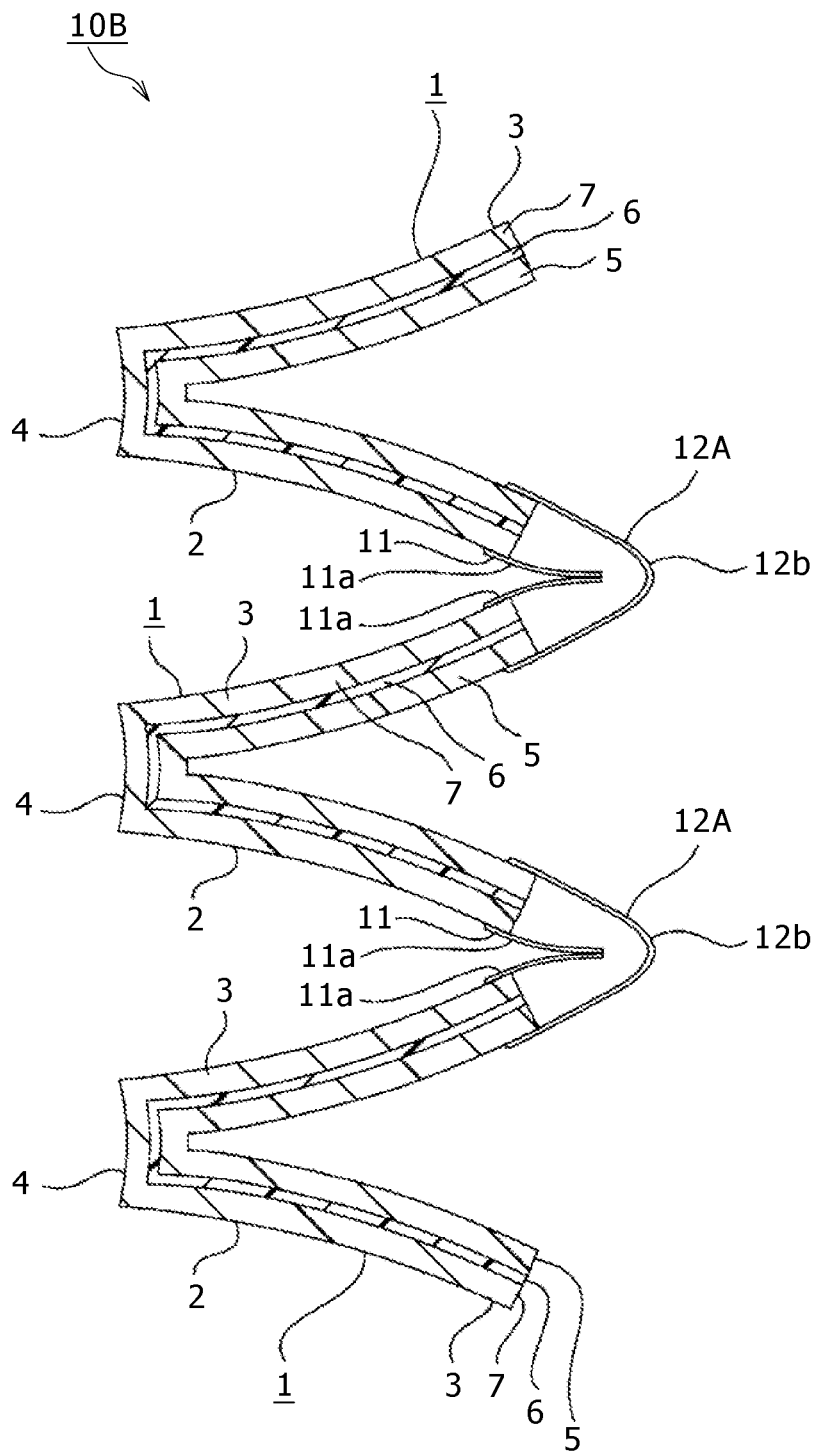
FIG. 14 is an enlarged cross sectional view showing an actuator device according to a fifth embodiment of the present disclosure.

Although in the foregoing, the case where the first coupling body 11 is composed of the two sheets of connection sheets 11a, 11a, and the second coupling body 12 is composed of the two sheets of connection sheets 12a, 12a has been exemplified, alternatively, as shown in FIG. 14, each of the first coupling body 11 and the second coupling body 12 may be composed of one sheet of connection sheet.

It is noted that FIG. 14 shows an actuator device 10B according to a fifth embodiment of the present disclosure in which only the second coupling body is composed of one sheet of connection sheet. In this case, a second coupling body 12A is composed of one sheet of connection sheet 12b, and both end portions of the one sheet of connection sheet 12b are joined to the inner electrode layers 5, 5 of the adjacent polymeric actuators 1, 1, respectively. In the actuator device 10B of the fifth embodiment, the polymeric actuator 1 according to the first embodiment of the present disclosure is used.

The second coupling body 12A which is composed of the one sheet of connection sheet 12b in such a manner is used, whereby it is possible to reduce the manufacturing cost owing to the reduction in the number of parts or components. It is noted that the first coupling body may be composed of one sheet of connection sheet, or each of the first coupling body and the second coupling body may be composed of one sheet of connection sheet.

Actuator Devices of Modified Changes of Fourth and Fifth Embodiments

Hereinafter, actuator devices according to first to fourth modified changes of each of the fourth and fifth embodiments of the present disclosure will be described in detail with reference to FIGS. 15 to 26.

It is noted that in the following actuator devices according to first to fourth modified changes of each of the fourth and fifth embodiments of the present disclosure, the structure in which two polymeric actuators are coupled to each other by one coupling body will be exemplified. However, the following actuator devices according to first to fourth modified changes of each of the fourth and fifth embodiments of the present disclosure are by no means limited to the structure in which two polymeric actuators are coupled to each other by one coupling body, and thus a structure may also be adopted in which three or more polymeric actuators are coupled to one another by the coupling body (bodies).

First Modified Changes of Fourth and Fifth Embodiments

Figure 15:
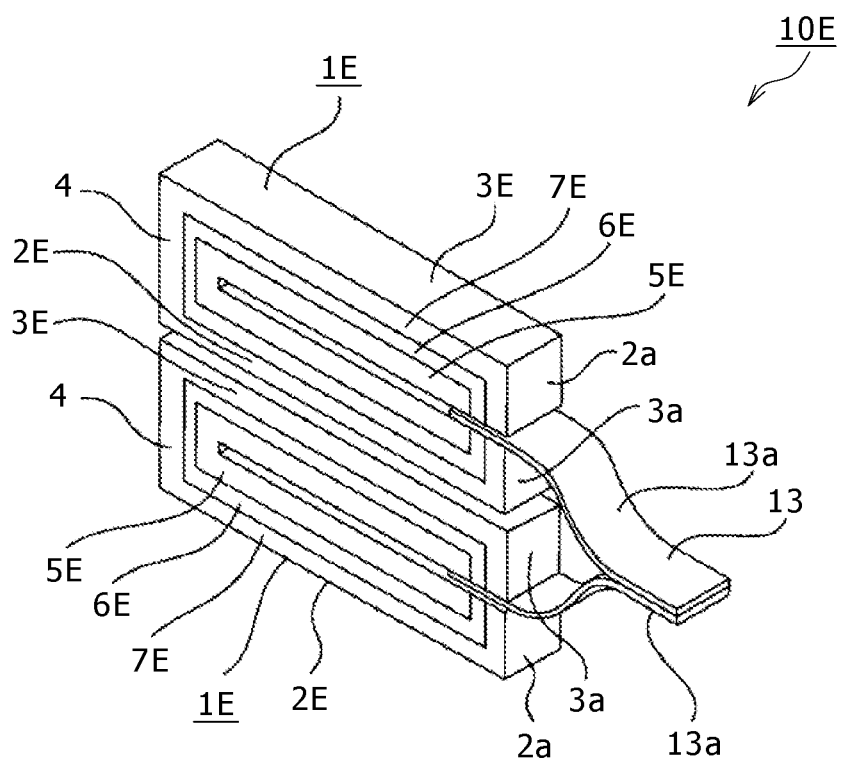
FIG. 15 is a perspective view showing an actuator device according to a first modified change of the fourth embodiment of the present disclosure.
Figure 16:
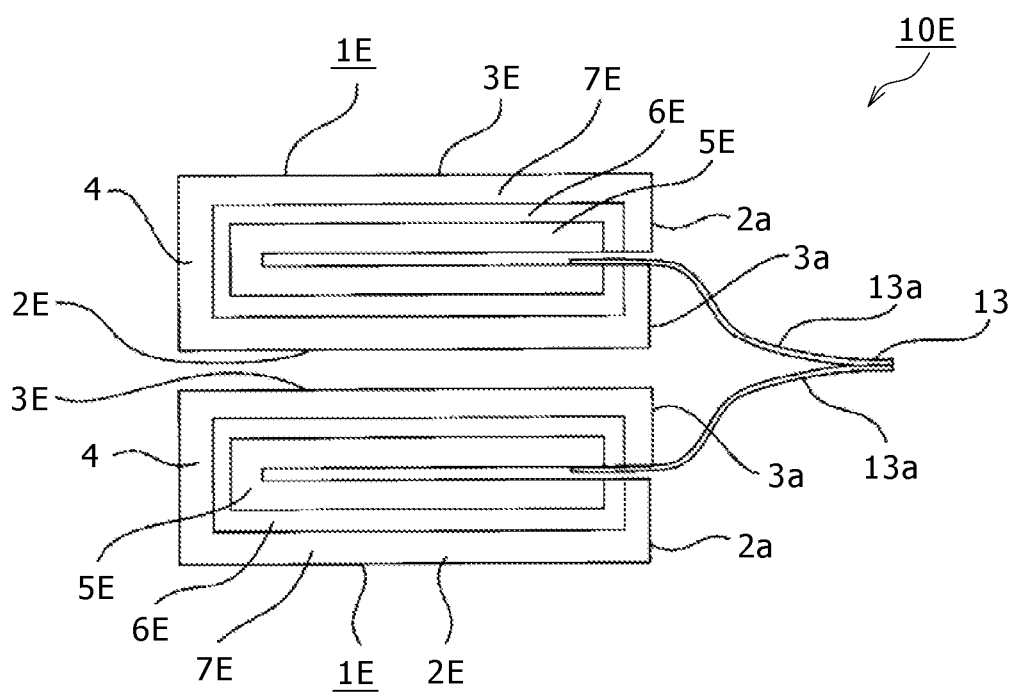
FIG. 16 is a side elevational view showing the actuator device according to the first modified change of the fourth embodiment of the present disclosure.

In an actuator device 10E according to a first modified change of the fourth embodiment of the present disclosure, as shown in FIGS. 15 and 16, polymeric actuators 1E, 1E are coupled to each other by a coupling body 13. In this case, the polymeric actuator 1E has substantially the same structure as that of the polymeric actuator 1 of the first embodiment.

The polymeric actuator 1E is composed of a first facing portion 2E, a second facing portion 3E, and the folded portion 4. The first facing portion 2E and the second facing portion 3E are each bent at 90° in a direction in which head portions of an electrolyte layer 6E come close to each other in end portions 2a, 3a on a side opposite to the folded portion 4.

Figure 17:
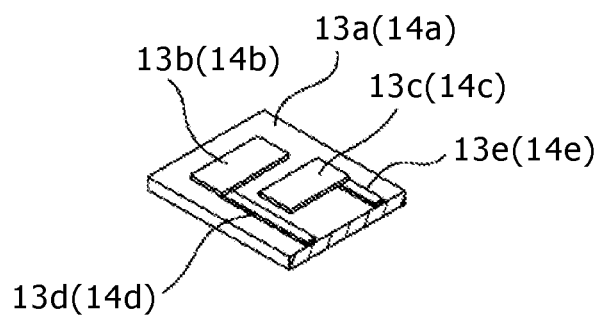
FIG. 17 is an enlarged perspective view showing an end portion of a coupling body used in the actuator device according to the first modified change of the fourth or fifth embodiment of the present disclosure.

The coupling body 13 is formed by joining one end portions of two sheets of connection sheets 13a, 13a to each other. In the coupling body 13, as shown in FIG. 17, connection terminal portions 13b, 13c are provided on one surface in the other end portion of the connection sheet 13a, that is, on a surface joined to the polymeric actuator 1E so as to be made away from each other in a longitudinal direction. Also, the connection terminal portions 13b, 13c of one connection sheet 13a, and the connection terminal portions 13b, 13c of the other connection sheet 13a are connected to each other by conductive wires 13d, 13e, respectively.

The coupling body 13 is previously subjected to a mask treatment for ensuring the insulating property in the portions other than the connection terminal portions 13b, 13c.

As far as the coupling body 13 concerned, the other end portions of the connection sheets 13a, 13a are joined to a lower surface of the end portion 3a of the second facing portion 3E in the lower polymeric actuator 1E, and an upper surface of the end portion 2a of the first facing portion 2E in the upper polymeric actuator 1E, respectively. At this time, the other end portions of the connection sheets 13a, 13a are joined so as to straddle the head surface of the electrolyte layer 6E at the end portions 3a, 2a. Thus, the connection terminal portions 13b, 13c of one connection sheet 13a are connected to an inner electrode layer 5E and an outer electrode layer 7E, respectively. Also, the connection terminal portions 13b, 13c of the other connection sheet 13a are connected to the inner electrode layer 5E and the outer electrode layer 7E, respectively.

It is noted that as far as the coupling body 13 concerned, the other end portions of the connection sheets 13a, 13a may be joined to the upper surface of the end portion 2a of the first facing portion 2E in the lower polymeric actuator 1E, and the lower surface of the end portion 3a of the second facing portion 3E in the upper polymeric actuator 1E, respectively.

Figure 18:
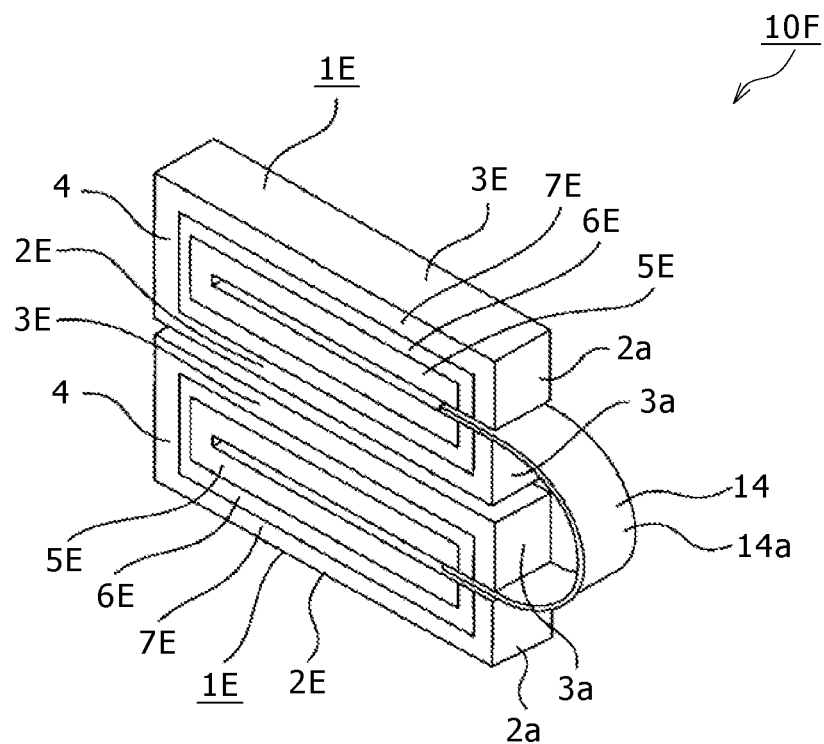
FIG. 18 is a perspective view showing an actuator device, in which one sheet of coupling body is used, according to a first modified change of the fifth embodiment of the present disclosure.

In addition, in the foregoing, there is exemplified the actuator device 10E in which the polymeric actuators 1E, 1E are coupled to each other by the coupling body 13 composed of the two sheets of connection sheets 13a, 13a joined to each other. However, in an actuator device 10F according to a first modified change of the fifth embodiment of the present disclosure, as shown in FIG. 18, polymeric actuators 1E, 1E are coupled to each other by a coupling body 14 composed of one sheet of connection sheet 14*a*. In this case, the polymeric actuator 1E has substantially the same structure as that of the polymeric actuator 1 according to the first embodiment of the present disclosure.

As far as the coupling body 14 concerned, as shown in FIG. 17, connection terminal portions 14*b*, 14*c*, 14*b*, 14*c* are provided on one surface in both end portions of the connection sheet 14*a* so as to be made away from each other in the longitudinal direction. Thus, the connection terminal portions 14*b*, 14*c* provided in one end portion, and the connection terminal portions 14*b*, 14*c* provided in the other end portion are connected to each other by conductive wires 14*d*, 14*e*, respectively.

As described above, in the actuator device 10E or the actuator device 10F, the polymeric actuators 1E, 1E are electrically connected to each other by one coupling body 13 or one coupling body 14. Therefore, it is possible to simplify the structure and reduce the manufacturing cost owing to the reduction in the number of parts or components.

Second Modified Change of Fourth and Fifth Embodiments

Figure 19:
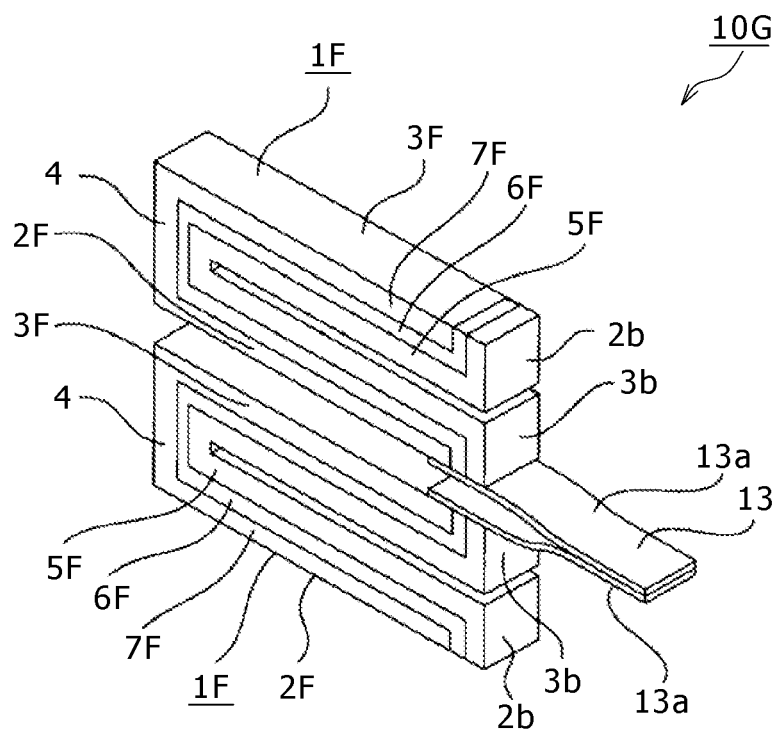
FIG. 19 is a perspective view showing an actuator device according to a second modified change of the fourth embodiment of the present disclosure.

An actuator device 10G according to a second modified change of the fourth embodiment of the present disclosure, as shown in FIG. 19, is structured in such a way that polymeric actuators 1F, 1F are coupled to each other by the coupling body 13.

The polymeric actuator 1F is composed of a first facing portion 2F, a second facing portion 3F, and the folded portion 4. In this case, the polymeric actuator 1F has the substantially the same structure as that of the polymeric actuator 1 according to the first embodiment of the present disclosure. The first facing portion 2F and the second facing portion 3F are bent at 90° in a direction in which head portions of an electrolyte layer 6F are made away from each other in end portions 2*b*, 3*b* on a side opposite to the folded portion 4.

As far as the coupling body 13 concerned, the other end portions of the connection sheets 13*a*, 13*a* are joined to an upper surface of the end portion 3*b* of the second facing portion 3F in the lower polymeric actuator 1F, and a lower surface of the end portion 2*b* of the first facing portion 2F in the upper polymeric actuator 1F, respectively. At this time, the other end portions of the connection sheets 13*a*, 13*a* are joined so as to straddle the head surface of the electrolyte layer 6F at the end portions 3*b*, 2*b*. Thus, the connection terminal portions 13*b*, 13*c* of one connection sheet 13*a* are connected to an inner electrode layer 5F and an outer electrode layer 7F, respectively. Also, the connection terminal portions 13*b*, 13*c* of the other connection sheet 13*a* are connected to the inner electrode layer 5F and the outer electrode layer 7F, respectively.

It is noted that as far as the coupling body 13 concerned, the other end portions of the connection sheets 13*a*, 13*a* may be joined to the lower surface of the end portion 2*b* of the first facing portion 2F in the lower polymeric actuator 1F, and the upper surface of the end portion 3*b* of the second facing portion 3F in the upper polymeric actuator 1F, respectively.

Figure 20:
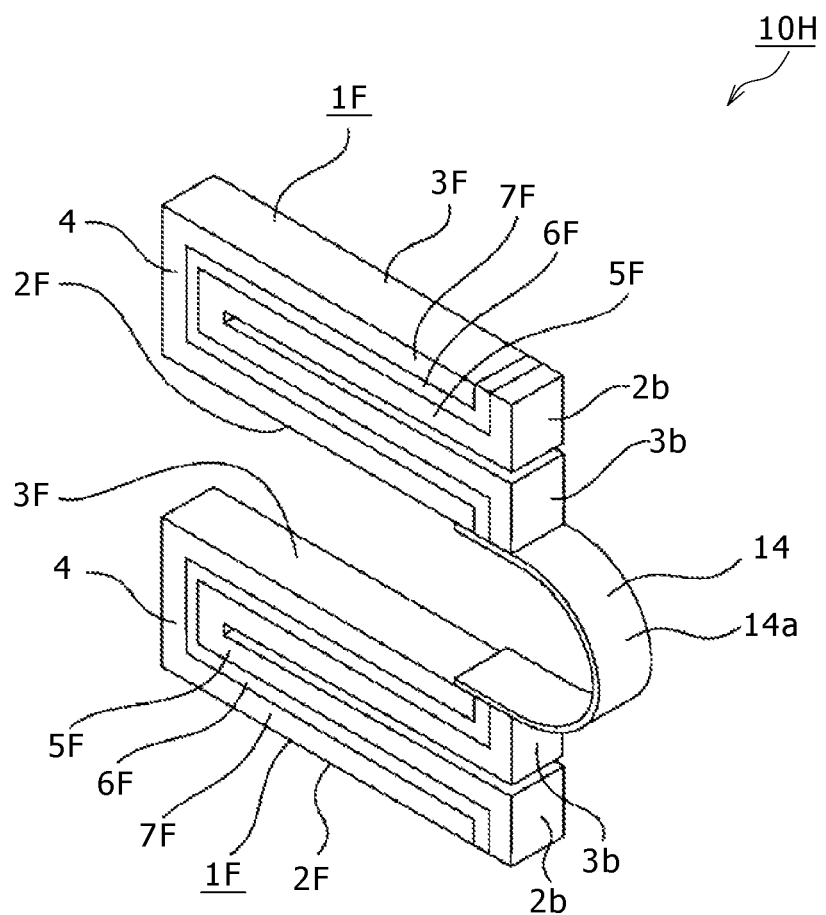
FIG. 20 is a perspective view showing an actuator device, in which one sheet of coupling body is used, according to a second modified change of the fifth embodiment of the present disclosure.

In addition, in the foregoing, there is exemplified the actuator device 10G in which the polymeric actuators 1F, 1F are coupled to each other by the coupling body 13 composed of the two sheets of connection sheets 13*a*, 13*a* joined to each other. However, in an actuator device 10H according to a second modified change of the fifth embodiment of the present disclosure, as shown in FIG. 20, polymeric actuators 1F, 1F are coupled to each other by a coupling body 14 composed of one sheet of connection sheet 14*a*.

As described above, in the actuator device 10G or the actuator device 10H, the polymeric actuators 1F, 1F are electrically connected to each other by one coupling body 13 or one coupling body 14. Therefore, it is possible to simplify the structure and reduce the manufacturing cost owing to the reduction in the number of parts or components.

Third Modified Changes of Fourth and Fifth Embodiments

Figure 21:
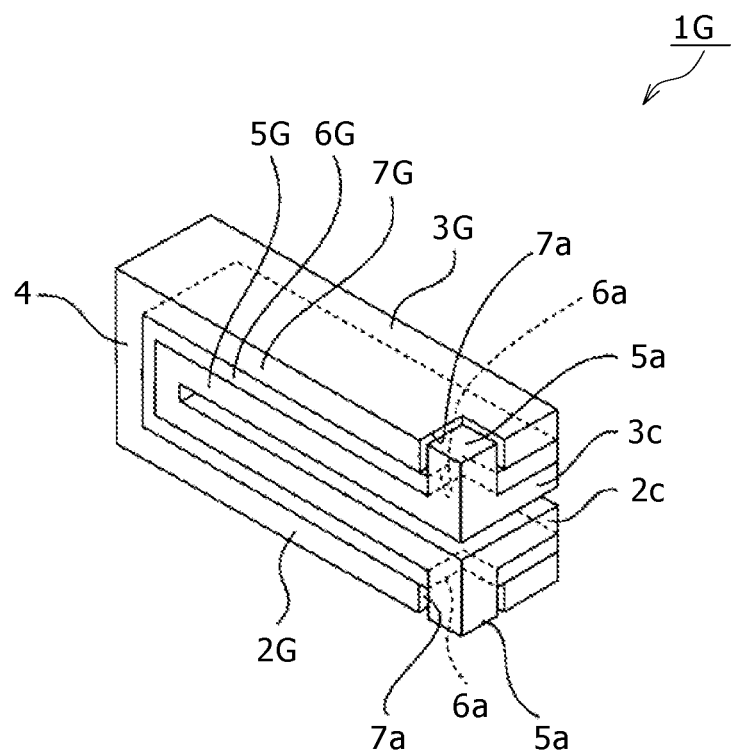
FIG. 21 is a perspective view showing a polymeric actuator used in an actuator device according to a third modified change of the fourth embodiment of the present disclosure.
Figure 22:
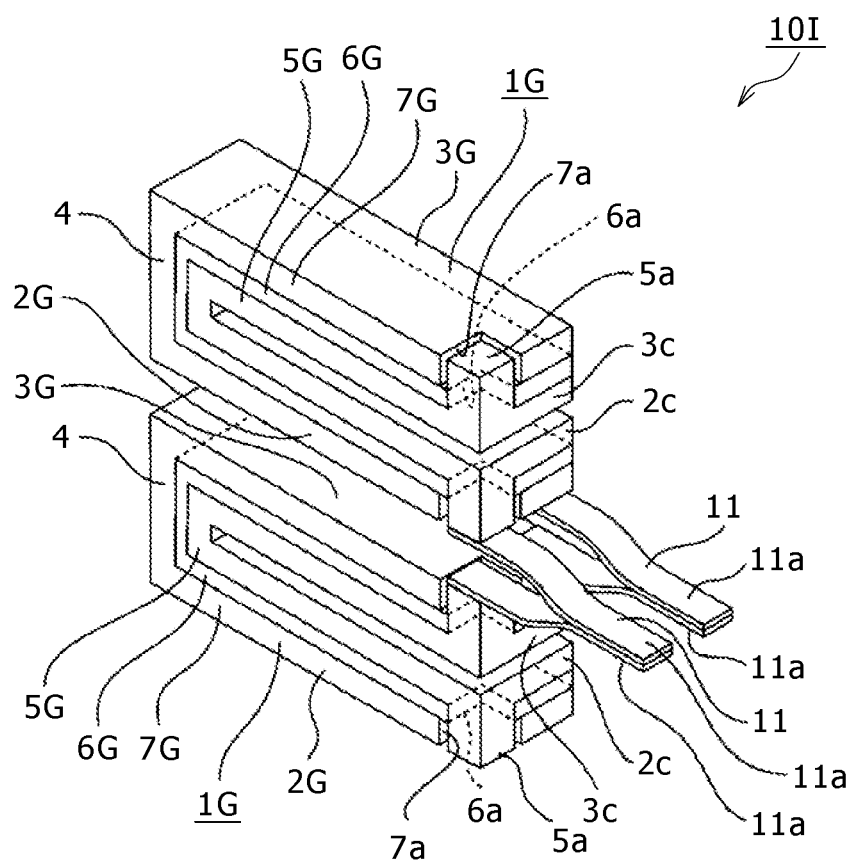
FIG. 22 is a perspective view showing the polymeric actuator used in the actuator device according to the third modified change of the fourth embodiment of the present disclosure.

An actuator device 10I according to a third modified change of the fourth embodiment of the present disclosure, as shown in FIGS. 21 and 22, is structured in such a way that polymeric actuators 1G, 1G are coupled to each other by coupling bodies 11, 11.

The polymeric actuator 1G is composed of a first facing portion 2G, a second facing portion 3G, and the folded portion 4. Cut-out portions 6*a*, 6*a*, and cut-out portions 7*a*, 7*a* are formed on the head portions of an electrolyte layer 6G, and the head portions of an outer electrode layer 7G, respectively, in end portions 2*c*, 3*c* of the first facing portion 2G and the second facing portion 3G on a side opposite to the folded portion 4. The cut-out portions 6*a*, 6*a*, and the cut-out portions 7*a*, 7*a* are vertically communicated with each other.

Protruding portions 5*a*, 5*a* which protrude either downward or upward so as to be inserted into the cut-out portions 6*a*, 6*a*, and the cut-out portions 7*a*, 7*a* are provided in the head portions of an inner electrode layer 5G. Gaps are defined between the protrusions 5*a*, 5*a* and the cut-out portions 7*a*, 7*a*, so that the protrusions 5*a*, 5*a* and the cut-out portions 7*a*, 7*a* are held in a non-contact state.

As shown in FIG. 22, as far as one first coupling body 11 concerned, the other end portions of connection sheets 11*a*, 11*a* are joined to an upper surface of the upper protrusion portion 5*a* of the inner electrode layer 5G in the lower polymeric actuator 1G, and an lower surface of the lower protrusion portion 5*a* of the inner electrode layer 5G in the upper polymeric actuator 1G, respectively.

On the other hand, as far as the other coupling body 11, the other end portions of connection sheets 11*a*, 11*a* are joined to an upper surface of the head portion of the outer electrode layer 7G located in the end portion 3*c* of the second facing portion 3G in the lower polymeric actuator 1G, and a lower surface of the head portion of the outer electrode layer 7G located in the end portion 2*c* of the first facing portion 2G in the upper polymeric actuator 1G, respectively.

Note that, as far as one first coupling body 11, the other end portions of connection sheets 11*a*, 11*a* may be joined to a lower surface of the lower protrusion portion 5*a* of the inner electrode layer 5G in the lower polymeric actuator 1G, and an upper surface of the upper protrusion portion 5*a* of the inner electrode layer 5G in the upper polymeric actuator 1G, respectively. Also, as far as the other coupling body 11 concerned, the other end portions of the connection sheets 11*a*, 11*a* may be joined to the lower surface of the head portions of the outer electrode layer 7G located in the end portion 2*c* of the first facing portion 2G in the lower polymeric actuator 1G, and the upper surface of the head portions of the outer electrode layer 7G located in the end portion 3*c* of the second facing portion 3G in the upper polymeric actuator 1G, respectively.

Figure 23:
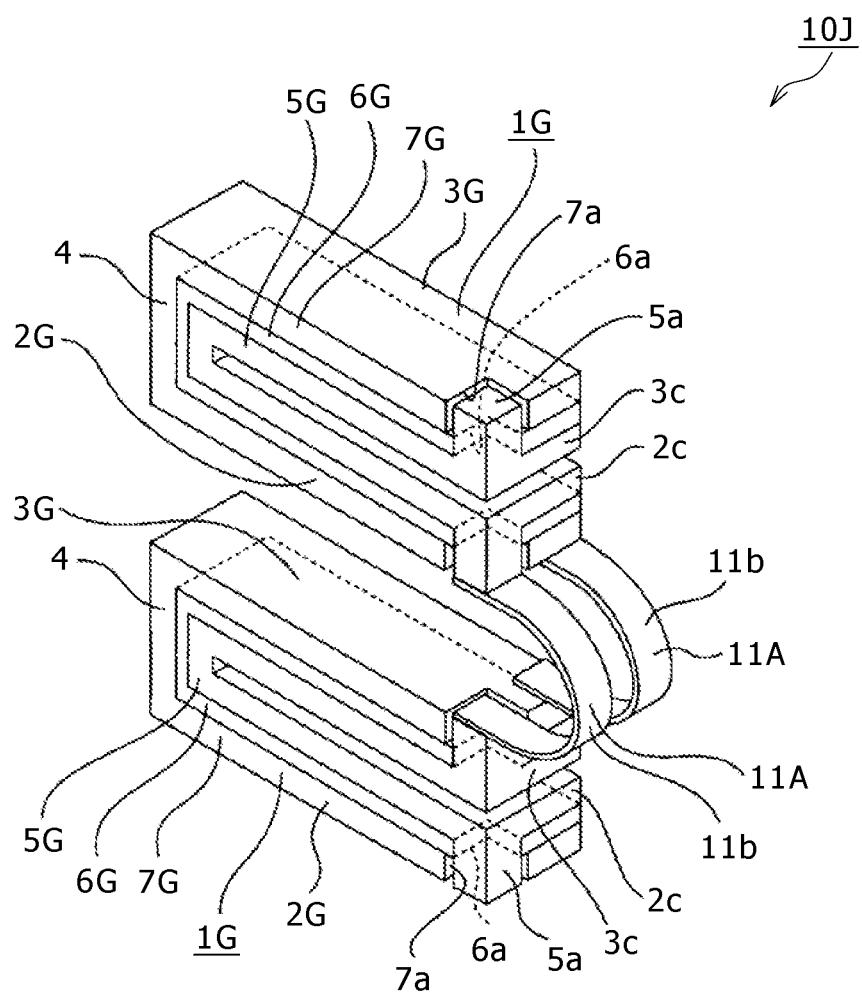
FIG. 23 is a perspective view showing an actuator device, in which two sheets of coupling bodies each composed of one sheet of connection sheet are used, according to a third modified change of the fifth embodiment of the present disclosure.

In addition, in the foregoing, there is exemplified the actuator device 10I in which the polymeric actuators 1G, 1G are coupled to each other by the first coupling bodies 11, 11 each obtained by joining the two sheets of connection sheets 11*a*, 11*a*. However, in an actuator device 10J according to a third modified change of the fifth embodiment of the present disclosure, as shown in FIG. 23, the polymeric actuators 1G, 1G are coupled to each other by first coupling bodies 11A, 11A each composed of one sheet of connection sheet 11*b*, 11*b*.

Fourth Modified Changes of Fourth and Fifth Embodiments

Figure 24:
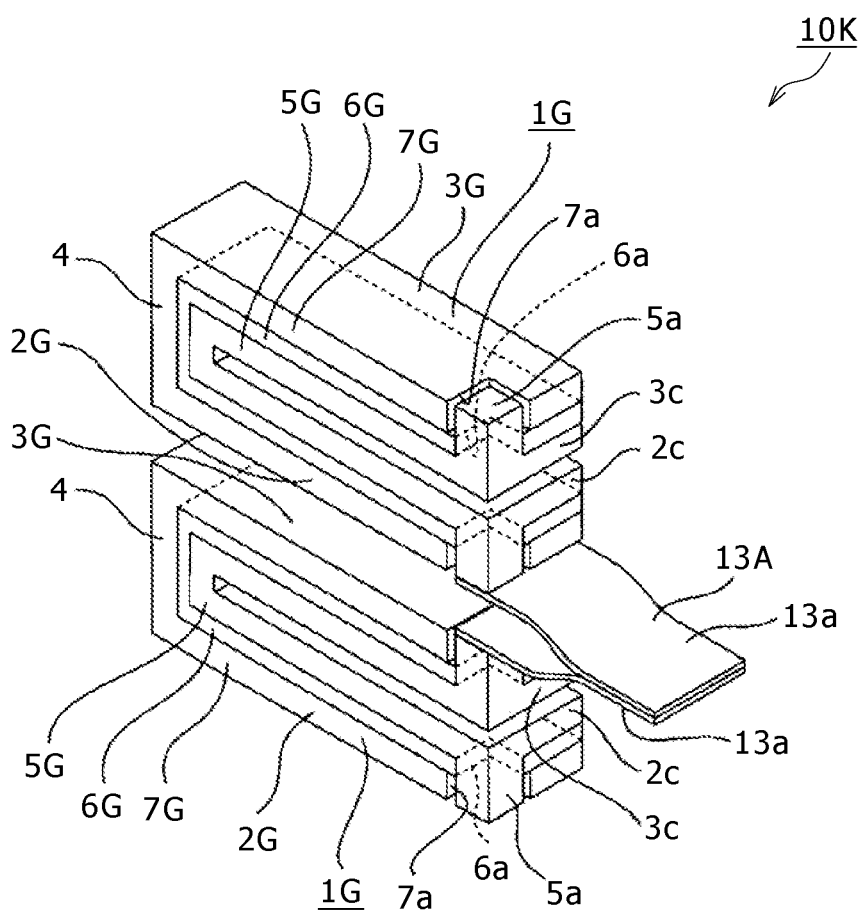
FIG. 24 is a perspective view showing an actuator device, in which one sheet of coupling body composed of two sheets of connection sheets is used, according to a fourth modified change of the fourth embodiment of the present disclosure.

In addition, as shown in FIG. 24, in an actuator device 10K according to a fourth modified change of the fourth embodiment, the polymeric actuators 1G, 1G are coupled to each other by a coupling body 13A obtained by joining one end portions of two sheets of connection sheets 13*a*, 13*a* to each other.

Figure 25:
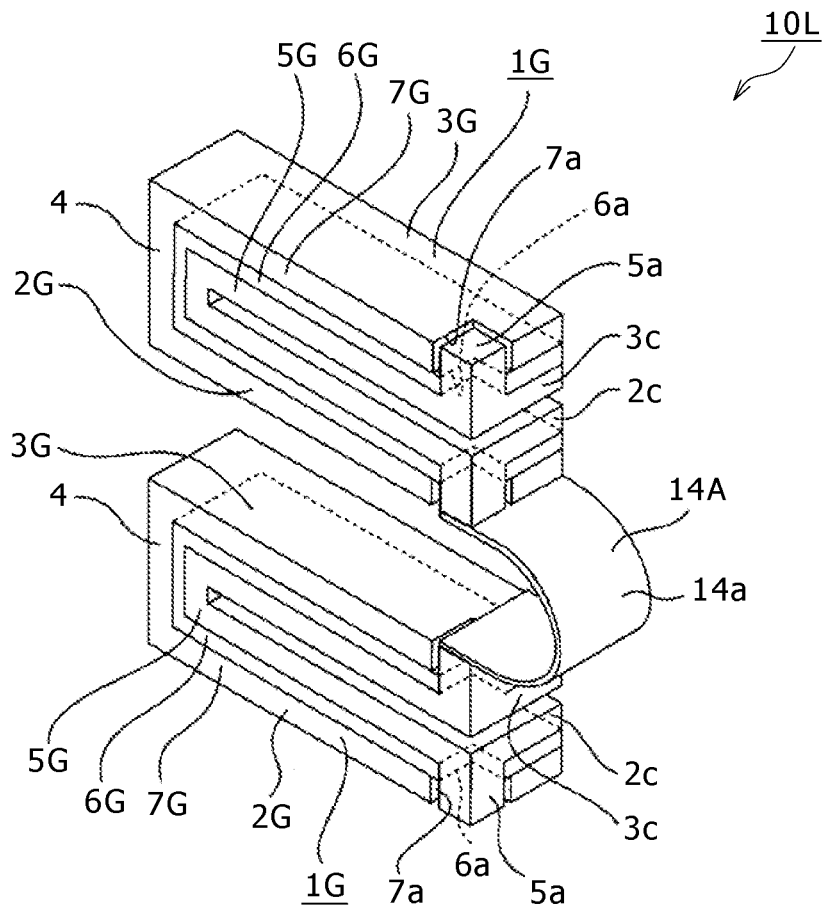
FIG. 25 is a perspective view showing an actuator device, in which one sheet of coupling body is used, according to a fourth modified change of the fifth embodiment of the present disclosure.

In addition, as shown in FIG. 25, in an actuator device 10L according to a fourth modified change of the fifth embodiment, the polymeric actuators 1G, 1G are coupled to each other by a coupling body 14A composed of one sheet of connection sheet 14*a*.

Figure 26:
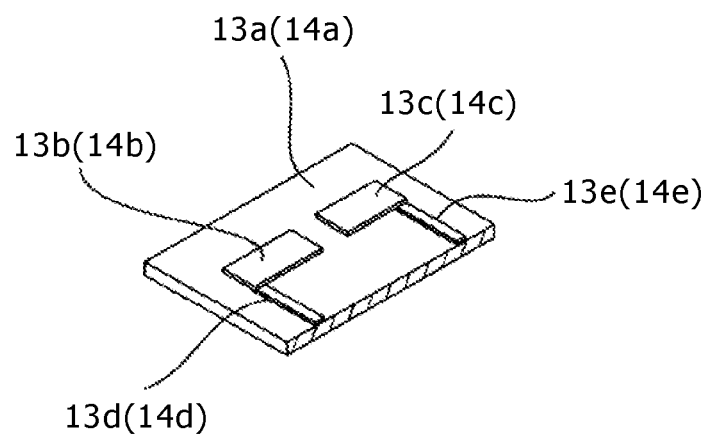
FIG. 26 is an enlarged perspective view showing an end portion of the coupling body used in the actuator device according to the fourth modified change of the fourth or fifth embodiment of the present disclosure.

In this case, as far as the coupling body 13A and the coupling body 14A concerned, as shown in FIG. 26, the connection terminal portions 13*b*, 13*c* or the connection terminal portions 14*b*, 14*c* are provided on one surface in the other end portion of the connection sheets 13*a*, 14*a*, that is, on a surface joined to the polymeric actuator 1G so as to be made away from each other in a width direction perpendicular to the longitudinal direction. The connection terminal portions 13*b*, 13*c* or the connection terminal portions 14*b*, 14*c* of one connection sheets 13*a*, 14*a*, and the connection terminal portions 13*b*, 13*c* or the connection terminal portions 14*b*, 14*c* of the other connection sheets 13*a*, 14*a* are connected to each other by the conductive wires 13*d*, 13*e* or the conductive wires 14*d*, 14*e*, respectively.

The coupling bodies 13A, 14A are previously subjected to the mask treatment for ensuring the insulating property in the portions other than the connection terminal portions 13*b*, 13*c* or the connection terminal portions 14*b*, 14*c*.

As far as the coupling bodies 13A, 14A concerned, the connection terminal portions 13*b*, 13*b*, 14*b*, 14*b* are connected to the protrusion portions 5*a*, 5*a* of the inner electrode layers 5G, 5G, respectively. Also, the connection terminal portions 13*c*, 13*c*, 14*c*, 14*c* are connected to the portions located on the sides of the protrusion portions 5*a*, 5*a* in the outer electrode layers 7G, 7G, respectively.

As described above, when in the actuator device 10I or 10J, the polymeric actuators 1G, 1G are electrically connected to each other by the first coupling bodies 11, 11 or the first coupling bodies 11A, 11A, the manufacturing cost can be reduced all the more because the mask treatment is unnecessary for the first coupling bodies 11, 11 or the first coupling bodies 11A, 11A.

In addition, when in the actuator device 10K or 10L, the polymeric actuators 1G, 1G are electrically connected to each other by one coupling body 13A or one coupling body 14A, it is possible to realize the simplification of the structure, and the reduction in the manufacturing cost owing to the reduction in the number of parts or components.

Method of Manufacturing Actuator Device

Hereinafter, a method of manufacturing the actuator device 10F according to the first modified change of the fifth embodiment of the present disclosure will be described in detail with reference to FIG. 27. Also, a method of manufacturing the actuator device 10H according to the second modified change of the fifth embodiment of the present disclosure will be described in detail with reference to FIG. 28. It is noted that the manufacturing method can also substantially apply to any of the actuator devices 10A, 10B, 10E, 10G, and 10I to 10L.

It is also noted that in the method of manufacturing the actuator device 10F, 10H, since the method of manufacturing the polymeric actuator 1 (including the polymeric actuator 1A to 1G, which applies to the following) is the same as that shown in FIGS. 12A to 12G, the description will be given below only with respect to the manufacturing method when the polymeric actuators 1E, 1E, 1F, 1F are coupled to each other. In the following, the description will be given by exemplifying the coupling of the polymeric actuators 1E, 1E by the coupling body 14 (refer to FIG. 27), and the coupling of the polymeric actuators 1F, 1F by the coupling body 14 (refer to FIG. 28).

Figure 27:
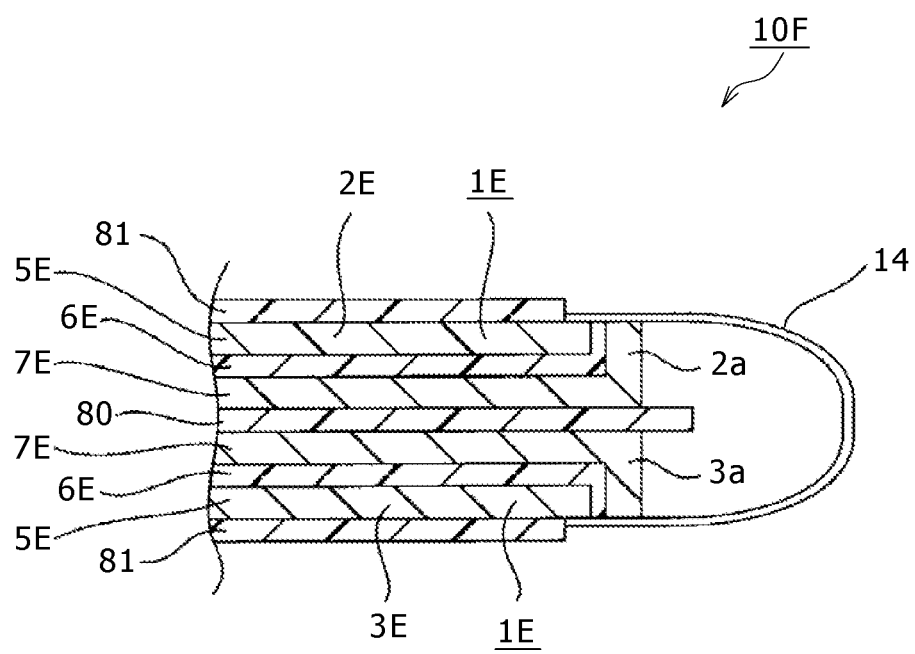
FIG. 27 is an enlarged cross sectional view explaining a method of manufacturing the actuator device according to the first modified change of the fifth embodiment of the present disclosure.

In the coupling of the polymeric actuators 1E, 1E by the coupling body 14, as shown in FIG. 27, a sheet-like partition member 80 having an insulating property is disposed between the second facing portion 3E of the low polymeric actuator 1E, and the first facing portion 2E of the upper polymeric actuator 1E.

In addition, sheet-like holding members 81, 81 each having an insulating property are disposed on the lower side of the second facing portion 3E of the lower polymeric actuator 1E, and the upper side of the first facing portion 2E of the upper polymeric actuator 1E, respectively. The sheet-like holding members 81, 81 are disposed in the portions except for the end portion 3*a* of the second facing portion 3E, and the end portion 2*a* of the first facing portion 2E, respectively.

Next, the both end portions of the coupling body 14 are disposed in the end portions 2*a*, 3*a*, respectively, and, for example, are subjected to the thermal compression bond, thereby joining the both end portions of the coupling body 14 to the end portions 2*a*, 3*a*, respectively.

Figure 28:
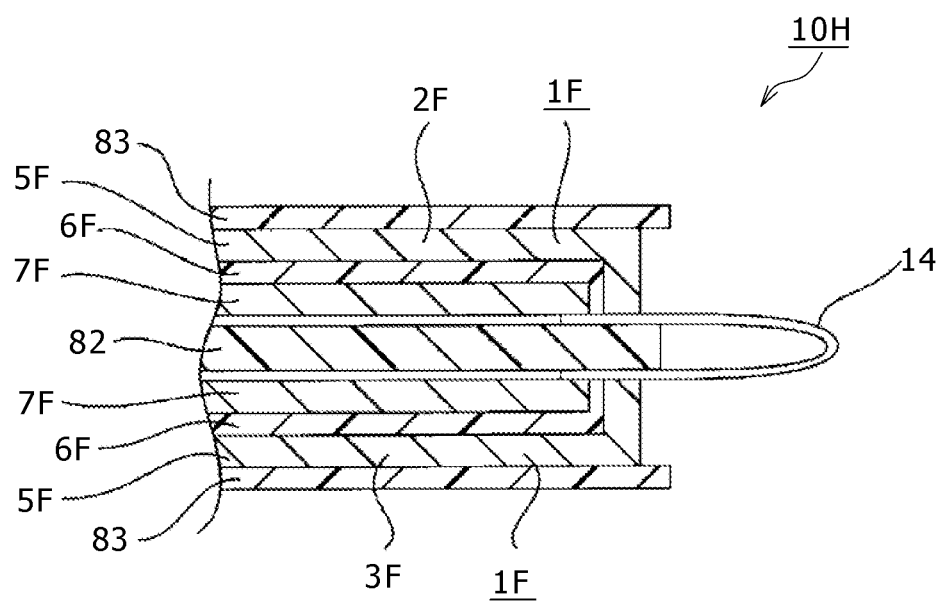
FIG. 28 is an enlarged cross sectional view explaining another method of manufacturing the actuator device according to the second modified change of the fifth embodiment of the present disclosure.

In the coupling of the polymeric actuators 1F, 1F by the coupling body 14, as shown in FIG. 28, a sheet-like partition member 82 having an insulating property is disposed between the second facing portion 3F of the low polymeric actuator 1F, and the first facing portion 2F of the upper polymeric actuator 1F. At this time, one end portion of the coupling body 14 is disposed between the lower surface of the sheet-like partition member 82, and the end portion 3*b* of the second facing portion 3F in the lower polymeric actuator 1F. Also, the other end portion of the coupling body 14 is disposed between the upper surface of the sheet-like partition member 82, and the end portion 2*b* of the first facing portion 2F in the upper polymeric actuator 1F.

In addition, sheet-like holding members 83, 83 each having an insulating property are disposed on the lower side of the second facing portion 3F of the lower polymeric actuator 1F, and the upper side of the first facing portion 2F of the upper polymeric actuator 1F, respectively. The sheet-like holding member 83, 83 are also located in the end portion 3*b* of the second facing portion 3F, and the end portion 2*b* of the first facing portion 2F, respectively.

Next, the sheet-like holding members 83, 83, for example, are subjected to the thermal compression bond from the outsides thereof through the end portion 3*b* of the second facing portion 3F, and the end portion 2*b* of the first facing portion 2F, thereby joining the both end portions of the coupling body 14 to the end portions 3*b*, 2*b*, respectively.

As described above, in the actuator device 10F, 10H (including any of the actuator devices 10A, 10B, 10E, 10G, and 10I to 10L), the joining of the polymeric actuator 1, 1 (including any of the polymeric actuator 1A to 1G) by the coupling body 14 (including any of the first coupling bodies 11, 11A, 13, 13A, 14A the second coupling body 12, 12B) is carried out in the state in which the partition member 80, 82 is disposed by, for example, carrying out the thermal compression bond.

Therefore, the manufacture of the actuator device 10F, 10H is easy, and thus it is possible to reduce the manufacturing cost.

Others

Examples of Application

The polymeric actuator 1 (including the polymeric actuator 1A to 1G, which applies to the following) or the actuator device 10A, 10B (including the actuator devices 10E to 10L, which applies to the following) which is structured in the manner as described above, for example, can be used as a displacement amount sensor or an external force sensor by using an electromotive force (a difference in electric potential developed across the inner electrode layer 5 (5E, 5F, 5G) and the outer electrode layer 7 (7E, 7F, 7G)) which is generated due to the deformation when an external force is applied.

At this time, a relationship between the displacement amount of the polymeric actuator 1, and the electromotive force which are generated by giving the deformation by the external force is previously measured, whereby the displacement amount can be readily measured from the electromotive force generated in the polymeric actuator 1.

An example in which the polymeric actuator 1 or the actuator device 10A, 10B is used as the displacement amount sensor or the external force sensor will be shown below with reference to FIG. 29.

A voltmeter 90 and a drive power source 91 are connected in parallel between the inner electrode layer 5 and the outer electrode layer 7 of the polymeric actuator 1. Also, the voltmeter 90 and the drive power source 91 can be switched by a switch 92 connected in series between the inner electrode layer 5 and the outer electrode layer 7.

For example, when a mechanism such as a lens unit (not shown) is connected to the polymeric actuator 1, since a direction of the force of the gravity is changed depending on a direction of a chassis in which the lens unit or the like are disposed, a load applied to the polymeric actuator 1 is changed accordingly. Therefore, even when a given drive voltage is applied to the polymeric actuator 1, a difference is generated in the displacement amount depending on the direction.

Figure 29:
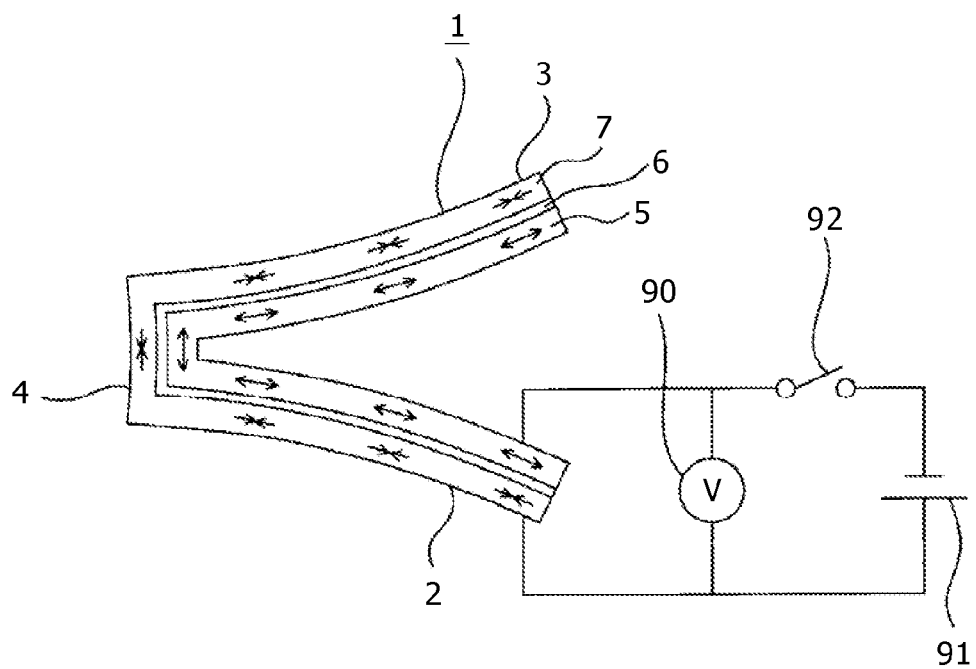
FIG. 29 is a conceptual view in the case where the polymeric actuator according to the first embodiment of the present disclosure is used as a sensor.

Then, a magnitude of the load is detected as needed based on the electromotive force by carrying out an intermittent operation in the system shown in FIG. 29, whereby such a power source voltage as to cancel the difference in the displacement amount is supplied to the polymeric actuator 1. As a result, it becomes possible to ensure the stable operation state of the polymeric actuator 1.

It is noted that the polymeric actuator 1 and the actuator device 10A, 10B may be used only as the displacement amount sensor or the external force sensor. Also, the polymeric actuator 1 and the actuator device 10A, 10B can also be used in such a way that the case where one of them is used as the sensor, and the case where those of them are used as the actuator are combined with each other.

Since the polymeric actuator 1 and the actuator device 10A, 10B are each lightweight, and the high silence property is ensured in the polymeric actuator 1 and the actuator device 10A, 10B at the time of driving, the polymeric actuator 1 and the actuator device 10A, 10B can be used as the following various kinds of actuators (driving portions).

For example, the polymeric actuator 1 and the actuator device 10A, 10B can be suitably used in a driving portion of a calibration device in an image pickup apparatus with a hand movement correcting function, a driving portion of a driving mechanism for moving an optical element such as a lens or a lens group in the image pickup apparatus, and a driving portion of a lens barrel (interchangeable lens) used in the image pickup apparatus. Also, the polymeric actuator 1 and the actuator device 10A, 10B can also be suitably used in a driving portion of auto-guider for taking in a light in an optical telescope, a driving portion of a lens driving mechanism or a barrel of an optical apparatus having a 2 optical system such as a stereoscopic camera or a pair of binoculars and a driving portion or a depressing portion for applying a compression force to a fiber for wavelength conversion of a fiber type wavelength-variable filter used in an optical communication, optical information processing, an optical measurement or the like. In addition, the polymeric actuator 1 and the actuator device 10A, 10B can also be suitably used in a driving portion of an optical axis aligning device, and a driving portion of a shutter mechanism, an iris driving mechanism or a diaphragm driving mechanism of the image pickup apparatus.

Moreover, the polymeric actuator 1 and the actuator device 10A, 10B, for example, can also be suitably used in a driving portion of a focal point depth adjusting device of a recording optical system for an image pickup device for a three-dimensional object, or a disc-like recording media, and a driving portion of a variable mirror for changing a shape of a driving object surface as an active curved surface by using plural actuators to approximately form a desired curved surface, thereby making it possible to readily make a focal point position variable. Also, the polymeric actuator 1 and the actuator device 10A, 10B can also be suitably used in a driving portion of a disc device which can linearly move a movement unit having at least one of the magnetic heads such as an optical pickup, a driving portion of a head feeding mechanism of a magnetic tape head actuator element assembly such a linear tape storage system, and a driving portion of an image forming apparatus which is applied to an electronic photographing system copy mechanism, a printer, a facsimile, and the like. In addition, the polymeric actuator 1 and the actuator device 10A, 10B can also be suitably used in a driving portion for a mount member such as a magnetic head member, a driving portion of an optical disc master exposure apparatus for driving a convergent lens group in an optical axis direction by carrying out the control, a driving portion of a head driving unit for driving an optical head, a driving portion of an information recording/reproducing apparatus for recording information in a recording media or reproducing the information recorded in the recording media, and a driving portion for an opening/closing operation of a circuit breaker (a circuit breaker for distribution of an electric power).

Furthermore, the polymeric actuator 1 and the actuator device 10A, 10B, for example, can also be suitably used in a driving portion of a joint mechanism represented by a wrist or the like of a robot arm in a robot or a manipulator including an automatic welding robot, an industrial robot, and a caring robot, a driving portion, for a joint, other than direct driving type one, and a driving portion of a motion converting mechanism, of a slide operable chuck device, which is used as a finger or a hand of a robot. In addition, the polymeric actuator 1 and the actuator device 10A, 10B can also be suitably used in a driving portion of a micromanipulator for manipulating a minute object in an arbitrary state in a cell minute manipulation, a work for assembling minute parts or components, and the like, a driving portion of a prosthetic limb such as an electric arm having plural operable and closable fingers, a driving portion of a robot for handling, a driving portion of an assistance device, and a driving portion of a power suit.

Technique of the Present Disclosure

The technique of the present disclosure can also be constituted in the following styles.

(1) A polymeric actuator including: a pair of facing portions located so as to face each other; and a folded portion through which one end portions of the pair of facing portions are coupled to each other, in which the pair of facing portions and the folded portion are composed of an inner electrode layer, an electrolyte layer, and an outer electrode layer which are laminated in order from an inside.

(2) The polymeric actuator described in the paragraph (1), in which at least a part of the polymeric actuator is bent within a surface perpendicular to a facing direction of the pair of facing portions.

(3) The polymeric actuator described in the paragraph (2), in which the polymeric actuator is formed in an annular or ring-like regular polygon-shape with a virtual axis extending in the facing direction as a center.

(4) The polymeric actuator described in any one of the paragraphs (1) to (3), further including: a first lamination body composed of one of the pair of facing portions, and one half portion of the folded portion; and a second lamination body composed of the other of the pair of facing portions, and the other half of the folded portion, in which the one half of the folded portion of the first lamination body, and the other half of the folded portion of the second lamination body are formed by joining in a state in which a partition member is disposed between the one of the pair of facing portions, and the other of the pair of facing portions.

(5) An actuator device including: plural polymeric actuators in each of which a pair of facing portions located so as to face each other, and a folded portion through which one end portions of the pair of facing portions are coupled to each other are composed of an inner electrode layer, an electrolyte layer, and an outer electrode layer which are laminated in order from an inside, in which the plural polymeric actuators are coupled to one another by a coupling body in a state in which the plural polymeric actuators are disposed side by side in a facing direction of the pair of facing portions.

(6) The actuator device described in the paragraph (5), in which end portions located on a side opposite to a side of the folded portion in the adjacent facing portions in the plural polymeric actuators are coupled to each other by the coupling body.

(7) The actuator device described in the paragraph (6), in which a thickness of the coupling body is made thinner than that of the folded portion.

(8) The actuator device described in the paragraph (6) or (7), in which hardness of the coupling body is made smaller than that of each of the polymeric actuators.

(9) The actuator device described in any one of the paragraphs (6) to (8), in which the coupling body is made of the same material as that of either the inner electrode layer or the outer electrode layer; and the inner electrode layers or the outer electrode layers of the plural polymeric actuators are coupled to each other by the coupling body.

(10) The actuator device described in any one of the paragraphs (6) to (9), in which the coupling body is made of a conductive material; and the inner electrode layers or the outer electrode layers of the plural polymeric actuators are coupled to one another by the coupling body.

(11) The actuator device described in the paragraph (10), in which the coupling body is composed of a flexible printed wiring board.

(12) The actuator device described in any one of the paragraphs (6) to (11), in which the coupling body is structured by joining one end portions of two sheets of connection sheets to each other; and the other end portion of one of the two sheets of connection sheets, and the other end portion of the other of the two sheets of connection sheets may be joined to the facing portions, respectively.

(13) The actuator device described in any one of the paragraphs (6) to (12), in which the coupling body is joined to each of the facing portions in a state in which a partition member is disposed between the facing portion of one of the plural polymeric actuators, and the facing portion of the other of the polymeric actuators.

(14) A method of manufacturing a polymeric actuator including: forming a first lamination body composed of an inner electrode layer, an electrolyte layer, and an outer electrode layer which are laminated in order; forming a second lamination body composed of an inner electrode layer, an electrolyte layer, and an outer electrode layer which are laminated in order; locating the first lamination body and the second lamination body so as to face each other in a state in which a partition member is disposed in a portion except for a part between the first lamination body and the second lamination body; joining portions, in none of which the partition member is disposed, of the first lamination body and the second lamination body to one another so that each of the portions thus joined is formed as a folded portion; and removing away the partition member from portions between the first lamination body and the second lamination body.

(15) A method of manufacturing an actuator device including: providing plural polymeric actuators in each of which a pair of facing portions located so as to face each other, and a folded portion through which one end portions of the pair of facing portions are coupled to each other are composed of an inner electrode layer, an electrolyte layer, and an outer electrode layer which are laminated in order from an inside; and joining the coupling body to each of the facing portions in a state in which a partition member is disposed between the facing portion of one of the plural polymeric actuators, and the facing portion of the other of the plural polymeric actuators.

Any of the concrete shapes and structures of the individual portions shown in the embodiments described above shows only an example of embodiments when the technique of the present disclosure is embodied, and the technical scope of the present disclosure should not be intended to be construed in a limiting sense.

The present disclosure contains subject matter related to that disclosed in Japanese Priority Patent Application JP 2012-123062 filed in the Japan Patent Office on May 30, 2012, the entire content of which is hereby incorporated by reference.

What is claimed is:

1. A polymeric actuator, comprising:
a pair of facing portions located so as to face each other; and
a folded portion through which one end portions of said pair of facing portions are coupled to each other,
wherein said pair of facing portions and said folded portion are composed of an inner electrode layer, an electrolyte layer, and an outer electrode layer which are laminated in order from an inside.

2. The polymeric actuator according to claim 1, wherein at least a part of said polymeric actuator is bent within a surface perpendicular to a facing direction of said pair of facing portions.

3. The polymeric actuator according to claim 2, wherein said polymeric actuator is formed in an annular or ring-like regular polygon-shape with a virtual axis extending in the facing direction as a center.

4. The polymeric actuator according to claim 1, further comprising:
   a first lamination body composed of one of said pair of facing portions, and one half portion of said folded portion; and
   a second lamination body composed of the other of said pair of facing portions, and the other half of the folded portion,
   wherein the one half of said folded portion of said first lamination body, and the other half of said folded portion of said second lamination body are formed by joining in a state in which a partition member is disposed between said one of said pair of facing portions, and the other of said pair of facing portions.

5. An actuator device, comprising
   plural polymeric actuators in each of which a pair of facing portions located so as to face each other, and a folded portion through which one end portions of said pair of facing portions are coupled to each other are composed of an inner electrode layer, an electrolyte layer, and an outer electrode layer which are laminated in order from an inside,
   wherein said plural polymeric actuators are coupled to one another by a coupling body in a state in which said plural polymeric actuators are disposed side by side in a facing direction of said pair of facing portions.

6. The actuator device according to claim 5, wherein end portions located on a side opposite to a side of said folded portion in the adjacent facing portions in said plural polymeric actuators are coupled to each other by said coupling body.

7. The actuator device according to claim 6, wherein a thickness of said coupling body is made thinner than that of said folded portion.

8. The actuator device according to claim 6, wherein hardness of said coupling body is made smaller than that of each of said polymeric actuators.

9. The actuator device according to claim 6,
   wherein said coupling body is made of the same material as that of either said inner electrode layer or said outer electrode layer; and
   said inner electrode layers or said outer electrode layers of said plural polymeric actuators are coupled to one another by said coupling body.

10. The actuator device according to claim 6,
    wherein said coupling body is made of a conductive material; and
    said inner electrode layers or said outer electrode layers of said plural polymeric actuators are coupled to one another by said coupling body.

11. The actuator device according to claim 10, wherein said coupling body is composed of a flexible printed wiring board.

12. The actuator device according to claim 6,
    wherein said coupling body is structured by joining one end portions of two sheets of connection sheets to each other; and
    the other end portion of one of said two sheets of connection sheets, and the other end portion of the other of said two sheets of connection sheets are joined to said facing portions, respectively.

13. The actuator device according to claim 6, wherein said coupling body is joined to each of said facing portions in a state in which a partition member is disposed between the facing portion of one of said plural polymeric actuators, and the facing portion of the other of said plural polymeric actuators.

14. A method of manufacturing a polymeric actuator, comprising:
    forming a first lamination body composed of an inner electrode layer, an electrolyte layer, and an outer electrode layer which are laminated in order;
    forming a second lamination body composed of an inner electrode layer, an electrolyte layer, and an outer electrode layer which are laminated in order;
    locating said first lamination body and said second lamination body so as to face each other in a state in which a partition member is disposed in a portion except for a part between said first lamination body and said second lamination body;
    joining portions, in none of which said partition member is disposed, of said first lamination body and said second lamination body to one another so that each of said portions thus joined is formed as a folded portion; and
    removing away said partition member from said part between said first lamination body and said second lamination body.

15. A method of manufacturing an actuator device, comprising:
    providing plural polymeric actuators in each of which a pair of facing portions located so as to face each other, and a folded portion through which one end portions of said pair of facing portions are coupled to each other are composed of an inner electrode layer, an electrolyte layer, and an outer electrode layer which are laminated in order from an inside; and
    joining said coupling body to each of said facing portions in a state in which a partition member is disposed between said facing portion of one of said plural polymeric actuators, and said facing portion of the other of said plural polymeric actuators.

* * * * *